US012764083B2

(12) United States Patent
Blackstock et al.

(10) Patent No.: US 12,764,083 B2
(45) **Date of Patent: *Oct. 13, 2026**

(54) CONTEXTUAL GENERATION AND SELECTION OF CUSTOMIZED MEDIA CONTENT

(71) Applicant: Snap Inc., Santa Monica, CA (US)

(72) Inventors: Jacob Edward Blackstock, Toronto (CA); Matthew Colin Grantham, Toronto (CA); Jason Bernard Innis, Toronto (CA)

(73) Assignee: Snap Inc., Santa Monica, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 18/761,017

(22) Filed: Jul. 1, 2024

(65) Prior Publication Data

US 2024/0356879 A1 Oct. 24, 2024

Related U.S. Application Data

(63) Continuation of application No. 18/162,531, filed on Jan. 31, 2023, now Pat. No. 12,028,301, which is a (Continued)

(51) Int. Cl.

| | |
|---|---|
| ***H04L 51/10*** | (2022.01) |
| ***G06Q 10/107*** | (2023.01) |
| ***H04L 51/063*** | (2022.01) |

(52) U.S. Cl.

CPC ........... *H04L 51/10* (2013.01); *G06Q 10/107* (2013.01); *H04L 51/063* (2013.01)

(58) Field of Classification Search

CPC ....... H04L 51/04; H04L 51/10; H04L 51/216; H04L 67/06; G06F 3/0481; G06F 16/958;

(Continued)

(56) References Cited

U.S. PATENT DOCUMENTS

| | | | |
|---|---|---|---|
| 666,223 | A | 1/1901 | Shedlock |
| 4,581,634 | A | 4/1986 | Williams |

(Continued)

FOREIGN PATENT DOCUMENTS

| | | | |
|---|---|---|---|
| CA | 2887596 | A1 | 7/2015 |
| CN | 103369369 | A | 10/2013 |

(Continued)

OTHER PUBLICATIONS

"A Whole New Story", Snap, Inc., [Online] Retrieved from the Internet: <URL: https://www.snap.com/en-US/news/>, (2017), 13 pgs.

(Continued)

*Primary Examiner* — Dustin Nguyen

(74) *Attorney, Agent, or Firm* — Schwegman Lundberg & Woessner, P.A.

(57) ABSTRACT

Among other things, embodiments of the present disclosure improve the functionality of electronic messaging software and systems by generating and selecting customized media content items (such as images) with avatars of different users within electronic messages based on the context of communications between the users. For example, users of different mobile computing devices can exchange electronic communications with each other, and the system can analyze these communications to present options for media content items containing the users' avatars based on content in the communications, actions or events taken by or involving the users, or combinations thereof. The users may select such media content items for inclusion in their electronic communications.

20 Claims, 13 Drawing Sheets

Related U.S. Application Data continuation of application No. 15/486,117, filed on Apr. 12, 2017, now Pat. No. 11,616,745.

(60) Provisional application No. 62/443,996, filed on Jan. 9, 2017.

(58) Field of Classification Search
CPC .... G06Q 10/10; G06Q 30/0269; G06Q 40/08; A63F 13/332
See application file for complete search history.

(56) References Cited

U.S. PATENT DOCUMENTS 4,975,690 A 12/1990 Torres
5,072,412 A 12/1991 Henderson, Jr. et al.
5,493,692 A 2/1996 Theimer et al.
5,713,073 A 1/1998 Warsta
5,754,939 A 5/1998 Herz et al.
5,855,008 A 12/1998 Goldhaber et al.
5,880,731 A * 3/1999 Liles ..................... G06F 3/0481 345/473
5,883,639 A 3/1999 Walton et al.
5,999,932 A 12/1999 Paul
6,012,098 A 1/2000 Bayeh et al.
6,014,090 A 1/2000 Rosen et al.
6,023,270 A 2/2000 Brush, II et al.
6,029,141 A 2/2000 Bezos et al.
6,038,295 A 3/2000 Mattes
6,049,711 A 4/2000 Yehezkel et al.
6,154,764 A 11/2000 Nitta et al.
6,167,435 A 12/2000 Druckenmiller et al.
6,204,840 B1 3/2001 Petelycky et al.
6,205,432 B1 3/2001 Gabbard et al.
6,216,141 B1 4/2001 Straub et al.
6,223,165 B1 4/2001 Lauffer
6,285,381 B1 9/2001 Sawano et al.
6,285,987 B1 9/2001 Roth et al.
6,310,694 B1 10/2001 Okimoto et al.
6,317,789 B1 11/2001 Rakavy et al.
6,334,149 B1 12/2001 Davis, Jr. et al.
6,349,203 B1 2/2002 Asaoka et al.
6,353,170 B1 3/2002 Eyzaguirre et al.
6,446,004 B1 9/2002 Cao et al.
6,449,657 B2 9/2002 Stanbach et al.
6,456,852 B2 9/2002 Bar et al.
6,484,196 B1 11/2002 Maurille
6,487,601 B1 11/2002 Hubacher et al.
6,523,008 B1 2/2003 Avrunin
6,542,749 B2 4/2003 Tanaka et al.
6,549,768 B1 4/2003 Fraccaroli
6,618,593 B1 9/2003 Drutman et al.
6,622,174 B1 9/2003 Ukita et al.
6,631,463 B1 10/2003 Floyd et al.
6,636,247 B1 10/2003 Hamzy et al.
6,636,855 B2 10/2003 Holloway et al.
6,643,684 B1 11/2003 Malkin et al.
6,658,095 B1 12/2003 Yoakum et al.
6,665,531 B1 12/2003 Soderbacka et al.
6,668,173 B2 12/2003 Greene
6,684,238 B1 1/2004 Dutta
6,684,257 B1 1/2004 Camut et al.
6,698,020 B1 2/2004 Zigmond et al.
6,700,506 B1 3/2004 Winkler
6,720,860 B1 4/2004 Narayanaswami
6,724,403 B1 4/2004 Santoro et al.
6,757,713 B1 6/2004 Ogilvie et al.
6,772,195 B1 8/2004 Hatlelid et al.
6,832,222 B1 12/2004 Zimowski
6,834,195 B2 12/2004 Brandenberg et al.
6,836,792 B1 12/2004 Chen
6,842,779 B1 1/2005 Nishizawa
6,898,626 B2 5/2005 Ohashi
6,959,324 B1 10/2005 Kubik et al.
6,970,088 B2 11/2005 Kovach
6,970,907 B1 11/2005 Ullmann et al.
6,980,909 B2 12/2005 Root et al.
6,981,040 B1 12/2005 Konig et al.
7,020,494 B2 3/2006 Spriestersbach et al.
7,027,124 B2 4/2006 Foote et al.
7,072,963 B2 7/2006 Anderson et al.
7,085,571 B2 8/2006 Kalhan et al.
7,110,744 B2 9/2006 Freeny, Jr.
7,124,164 B1 10/2006 Chemtob
7,149,893 B1 12/2006 Leonard et al.
7,173,651 B1 2/2007 Knowles
7,188,143 B2 3/2007 Szeto
7,203,380 B2 4/2007 Chiu et al.
7,206,568 B2 4/2007 Sudit
7,227,937 B1 6/2007 Yoakum et al.
7,237,002 B1 6/2007 Estrada et al.
7,240,089 B2 7/2007 Boudreau
7,269,426 B2 9/2007 Kokkonen et al.
7,280,658 B2 10/2007 Amini et al.
7,315,823 B2 1/2008 Brondrup
7,342,587 B2 3/2008 Danzig et al.
7,349,768 B2 3/2008 Bruce et al.
7,356,564 B2 4/2008 Hartselle et al.
7,394,345 B1 7/2008 Ehlinger et al.
7,411,493 B2 8/2008 Smith
7,423,580 B2 9/2008 Markhovsky et al.
7,454,442 B2 11/2008 Cobleigh et al.
7,468,729 B1 12/2008 Levinson
7,508,419 B2 3/2009 Toyama et al.
7,512,649 B2 3/2009 Faybishenko et al.
7,519,670 B2 4/2009 Hagale et al.
7,535,890 B2 5/2009 Rojas
7,546,554 B2 6/2009 Chiu et al.
7,607,096 B2 10/2009 Oreizy et al.
7,636,755 B2 12/2009 Blattner et al.
7,639,251 B2 12/2009 Gu et al.
7,639,943 B1 12/2009 Kalajan
7,650,231 B2 1/2010 Gadler
7,668,537 B2 2/2010 DeVries
7,770,137 B2 8/2010 Forbes et al.
7,775,885 B2 8/2010 Van Luchene et al.
7,778,973 B2 8/2010 Choi
7,779,444 B2 8/2010 Glad
7,787,886 B2 8/2010 Markhovsky et al.
7,796,946 B2 9/2010 Eisenbach
7,801,954 B2 9/2010 Cadiz et al.
7,856,360 B2 12/2010 Kramer et al.
7,859,551 B2 12/2010 Bulman et al.
7,885,931 B2 2/2011 Seo et al.
7,925,703 B2 4/2011 Dinan et al.
8,001,204 B2 8/2011 Burtner et al.
8,032,586 B2 10/2011 Challenger et al.
8,082,255 B1 12/2011 Carlson, Jr. et al.
8,088,044 B2 1/2012 Tchao et al.
8,090,351 B2 1/2012 Klein
8,095,878 B2 1/2012 Bates et al.
8,098,904 B2 1/2012 Ioffe et al.
8,099,109 B2 1/2012 Altman et al.
8,108,774 B2 1/2012 Finn et al.
8,112,716 B2 2/2012 Kobayashi
8,117,281 B2 2/2012 Robinson et al.
8,130,219 B2 3/2012 Fleury et al.
8,131,597 B2 3/2012 Hudetz
8,135,166 B2 3/2012 Rhoads
8,136,028 B1 3/2012 Loeb et al.
8,146,001 B1 3/2012 Reese
8,146,005 B2 3/2012 Jones et al.
8,151,191 B2 4/2012 Nicol
8,161,115 B2 4/2012 Yamamoto
8,161,417 B1 4/2012 Lee
8,195,203 B1 6/2012 Tseng
8,199,747 B2 6/2012 Rojas et al.
8,208,943 B2 6/2012 Petersen
8,214,443 B2 7/2012 Hamburg
8,234,350 B1 7/2012 Gu et al.
8,276,092 B1 9/2012 Narayanan et al.
8,279,319 B2 10/2012 Date
8,280,406 B2 10/2012 Ziskind et al.
8,285,199 B2 10/2012 Hsu et al.

(56) References Cited

U.S. PATENT DOCUMENTS

| | | | |
|---|---|---|---|
| 8,287,380 | B2 | 10/2012 | Nguyen et al. |
| 8,301,159 | B2 | 10/2012 | Hamynen et al. |
| 8,306,922 | B1 | 11/2012 | Kunal et al. |
| 8,312,086 | B2 | 11/2012 | Velusamy et al. |
| 8,312,097 | B1 | 11/2012 | Siegel et al. |
| 8,326,315 | B2 | 12/2012 | Phillips et al. |
| 8,326,327 | B2 | 12/2012 | Hymel et al. |
| 8,332,475 | B2 | 12/2012 | Rosen et al. |
| 8,352,546 | B1 | 1/2013 | Dollard |
| 8,379,130 | B2 | 2/2013 | Forutanpour et al. |
| 8,384,719 | B2 | 2/2013 | Reville et al. |
| 8,385,950 | B1 | 2/2013 | Wagner et al. |
| RE44,054 | E | 3/2013 | Kim |
| 8,396,708 | B2 | 3/2013 | Park et al. |
| 8,402,097 | B2 | 3/2013 | Szeto |
| 8,405,773 | B2 | 3/2013 | Hayashi et al. |
| 8,418,067 | B2 | 4/2013 | Cheng et al. |
| 8,423,409 | B2 | 4/2013 | Rao |
| 8,425,322 | B2 | 4/2013 | Gillo et al. |
| 8,458,601 | B2 | 6/2013 | Castelli et al. |
| 8,462,198 | B2 | 6/2013 | Lin et al. |
| 8,471,914 | B2 | 6/2013 | Sakiyama et al. |
| 8,472,935 | B1 | 6/2013 | Fujisaki |
| 8,484,158 | B2 | 7/2013 | Deluca et al. |
| 8,495,503 | B2 | 7/2013 | Brown et al. |
| 8,495,505 | B2 | 7/2013 | Smith et al. |
| 8,504,926 | B2 | 8/2013 | Wolf |
| 8,510,383 | B2 | 8/2013 | Hurley et al. |
| 8,527,345 | B2 | 9/2013 | Rothschild et al. |
| 8,554,627 | B2 | 10/2013 | Svendsen et al. |
| 8,559,980 | B2 | 10/2013 | Pujol |
| 8,560,612 | B2 | 10/2013 | Kilmer et al. |
| 8,564,621 | B2 | 10/2013 | Branson et al. |
| 8,564,710 | B2 | 10/2013 | Nonaka et al. |
| 8,581,911 | B2 | 11/2013 | Becker et al. |
| 8,594,680 | B2 | 11/2013 | Ledlie et al. |
| 8,597,121 | B2 | 12/2013 | del Valle |
| 8,601,051 | B2 | 12/2013 | Wang |
| 8,601,379 | B2 | 12/2013 | Marks et al. |
| 8,613,089 | B1 | 12/2013 | Holloway et al. |
| 8,632,408 | B2 | 1/2014 | Gillo et al. |
| 8,648,865 | B2 | 2/2014 | Dawson et al. |
| 8,659,548 | B2 | 2/2014 | Hildreth |
| 8,660,358 | B1 | 2/2014 | Bergboer et al. |
| 8,660,369 | B2 | 2/2014 | Llano et al. |
| 8,660,793 | B2 | 2/2014 | Ngo et al. |
| 8,682,350 | B2 | 3/2014 | Altman et al. |
| 8,683,354 | B2 | 3/2014 | Khandelwal et al. |
| 8,692,830 | B2 | 4/2014 | Nelson et al. |
| 8,718,333 | B2 | 5/2014 | Wolf et al. |
| 8,724,622 | B2 | 5/2014 | Rojas |
| 8,732,168 | B2 | 5/2014 | Johnson |
| 8,744,523 | B2 | 6/2014 | Fan et al. |
| 8,745,132 | B2 | 6/2014 | Obradovich |
| 8,761,800 | B2 | 6/2014 | Kuwahara |
| 8,768,876 | B2 | 7/2014 | Shim et al. |
| 8,775,972 | B2 | 7/2014 | Spiegel |
| 8,788,680 | B1 | 7/2014 | Naik |
| 8,790,187 | B2 | 7/2014 | Walker et al. |
| 8,797,415 | B2 | 8/2014 | Arnold |
| 8,798,646 | B1 | 8/2014 | Wang et al. |
| 8,810,513 | B2 | 8/2014 | Ptucha et al. |
| 8,812,171 | B2 | 8/2014 | Filev et al. |
| 8,832,201 | B2 | 9/2014 | Wall |
| 8,832,552 | B2 | 9/2014 | Arrasvuori et al. |
| 8,839,327 | B2 | 9/2014 | Amento et al. |
| 8,856,349 | B2 | 10/2014 | Jain et al. |
| 8,874,677 | B2 | 10/2014 | Rosen et al. |
| 8,886,227 | B2 | 11/2014 | Schmidt et al. |
| 8,890,926 | B2 | 11/2014 | Tandon et al. |
| 8,892,999 | B2 | 11/2014 | Nims et al. |
| 8,909,679 | B2 | 12/2014 | Root et al. |
| 8,909,725 | B1 | 12/2014 | Sehn |
| 8,924,250 | B2 | 12/2014 | Bates et al. |
| 8,963,926 | B2 | 2/2015 | Brown et al. |
| 8,972,357 | B2 | 3/2015 | Shim et al. |
| 8,989,786 | B2 | 3/2015 | Feghali |
| 8,995,433 | B2 | 3/2015 | Rojas |
| 9,015,285 | B1 | 4/2015 | Ebsen et al. |
| 9,020,745 | B2 | 4/2015 | Johnston et al. |
| 9,040,574 | B2 | 5/2015 | Wang et al. |
| 9,055,416 | B2 | 6/2015 | Rosen et al. |
| 9,086,776 | B2 | 7/2015 | Ye et al. |
| 9,094,137 | B1 | 7/2015 | Sehn et al. |
| 9,100,806 | B2 | 8/2015 | Rosen et al. |
| 9,100,807 | B2 | 8/2015 | Rosen et al. |
| 9,105,014 | B2 | 8/2015 | Collet et al. |
| 9,113,301 | B1 | 8/2015 | Spiegel et al. |
| 9,119,027 | B2 | 8/2015 | Sharon et al. |
| 9,123,074 | B2 | 9/2015 | Jacobs et al. |
| 9,143,382 | B2 | 9/2015 | Bhogal et al. |
| 9,143,681 | B1 | 9/2015 | Ebsen et al. |
| 9,152,477 | B1 | 10/2015 | Campbell et al. |
| 9,191,776 | B2 | 11/2015 | Root et al. |
| 9,204,252 | B2 | 12/2015 | Root |
| 9,215,095 | B2 | 12/2015 | Weaver et al. |
| 9,225,897 | B1 | 12/2015 | Sehn et al. |
| 9,241,184 | B2 | 1/2016 | Weerasinghe |
| 9,256,860 | B2 | 2/2016 | Herger et al. |
| 9,258,459 | B2 | 2/2016 | Hartley |
| 9,298,257 | B2 | 3/2016 | Hwang et al. |
| 9,314,692 | B2 | 4/2016 | Konoplev et al. |
| 9,330,483 | B2 | 5/2016 | Du et al. |
| 9,344,606 | B2 | 5/2016 | Hartley et al. |
| 9,357,174 | B2 | 5/2016 | Li et al. |
| 9,361,510 | B2 | 6/2016 | Yao et al. |
| 9,378,576 | B2 | 6/2016 | Bouaziz et al. |
| 9,385,983 | B1 | 7/2016 | Sehn |
| 9,396,354 | B1 | 7/2016 | Murphy et al. |
| 9,402,057 | B2 | 7/2016 | Kaytaz et al. |
| 9,407,712 | B1 | 8/2016 | Sehn |
| 9,407,816 | B1 | 8/2016 | Sehn |
| 9,412,192 | B2 | 8/2016 | Mandel et al. |
| 9,430,783 | B1 | 8/2016 | Sehn |
| 9,439,041 | B2 | 9/2016 | Parvizi et al. |
| 9,443,227 | B2 | 9/2016 | Evans et al. |
| 9,450,907 | B2 | 9/2016 | Pridmore et al. |
| 9,459,778 | B2 | 10/2016 | Hogeg et al. |
| 9,460,541 | B2 | 10/2016 | Li et al. |
| 9,489,661 | B2 | 11/2016 | Evans et al. |
| 9,489,760 | B2 | 11/2016 | Li et al. |
| 9,491,134 | B2 | 11/2016 | Rosen et al. |
| 9,503,845 | B2 | 11/2016 | Vincent |
| 9,508,197 | B2 | 11/2016 | Quinn et al. |
| 9,532,171 | B2 | 12/2016 | Allen et al. |
| 9,537,811 | B2 | 1/2017 | Allen et al. |
| 9,544,257 | B2 | 1/2017 | Ogundokun et al. |
| 9,548,998 | B1 | 1/2017 | Barros et al. |
| 9,576,400 | B2 | 2/2017 | Van Os et al. |
| 9,589,357 | B2 | 3/2017 | Li et al. |
| 9,592,449 | B2 | 3/2017 | Barbalet et al. |
| 9,628,950 | B1 | 4/2017 | Noeth et al. |
| 9,648,376 | B2 | 5/2017 | Chang et al. |
| 9,652,809 | B1 | 5/2017 | Levinson |
| 9,697,635 | B2 | 7/2017 | Quinn et al. |
| 9,706,040 | B2 | 7/2017 | Kadirvel et al. |
| 9,710,821 | B2 | 7/2017 | Heath |
| 9,744,466 | B2 | 8/2017 | Fujioka |
| 9,746,990 | B2 | 8/2017 | Anderson et al. |
| 9,749,270 | B2 | 8/2017 | Collet et al. |
| 9,792,714 | B2 | 10/2017 | Li et al. |
| 9,839,844 | B2 | 12/2017 | Dunstan et al. |
| 9,854,219 | B2 | 12/2017 | Sehn |
| 9,883,838 | B2 | 2/2018 | Kaleal, III et al. |
| 9,898,849 | B2 | 2/2018 | Du et al. |
| 9,911,073 | B1 | 3/2018 | Spiegel et al. |
| 9,936,165 | B2 | 4/2018 | Li et al. |
| 9,959,037 | B2 | 5/2018 | Chaudhri et al. |
| 9,980,100 | B1 | 5/2018 | Charlton et al. |
| 9,990,373 | B2 | 6/2018 | Fortkort |
| 10,039,988 | B2 | 8/2018 | Lobb et al. |
| 10,097,492 | B2 | 10/2018 | Tsuda et al. |
| 10,116,598 | B2 | 10/2018 | Tucker et al. |
| 10,155,168 | B2 | 12/2018 | Blackstock et al. |

(56) References Cited

U.S. PATENT DOCUMENTS 10,158,589 B2 12/2018 Collet et al.
10,242,477 B1 3/2019 Charlton et al.
10,242,503 B2 3/2019 McPhee et al.
10,262,250 B1 4/2019 Spiegel et al.
10,348,662 B2 * 7/2019 Baldwin ................ H04L 51/10
10,362,219 B2 7/2019 Wilson et al.
10,432,559 B2 10/2019 Baldwin et al.
10,454,857 B1 10/2019 Blackstock et al.
10,475,225 B2 11/2019 Park et al.
10,504,266 B2 12/2019 Blattner et al.
10,573,048 B2 2/2020 Ni et al.
10,656,797 B1 5/2020 Alvi et al.
10,657,695 B2 5/2020 Chand et al.
10,657,701 B2 5/2020 Osman et al.
10,674,311 B1 6/2020 Bouba et al.
10,762,174 B2 9/2020 Denton et al.
10,855,632 B2 * 12/2020 Kennedy ................ H04L 51/10
10,872,451 B2 12/2020 Sheth et al.
10,880,246 B2 12/2020 Baldwin et al.
10,893,385 B1 1/2021 Berardino et al.
10,895,964 B1 1/2021 Grantham et al.
10,896,534 B1 1/2021 Smith et al.
10,933,311 B2 3/2021 Brody et al.
10,936,066 B1 3/2021 Jaureguiberry et al.
10,938,758 B2 3/2021 Allen et al.
10,939,246 B1 3/2021 Dancie et al.
10,945,098 B2 3/2021 Dancie et al.
10,964,082 B2 3/2021 Amitay et al.
10,979,752 B1 4/2021 Brody et al.
10,984,575 B2 4/2021 Assouline et al.
10,992,619 B2 4/2021 Antmen et al.
11,010,022 B2 5/2021 Alvi et al.
11,030,789 B2 6/2021 Chand et al.
11,032,670 B1 6/2021 Baylin et al.
11,036,781 B1 6/2021 Baril et al.
11,039,270 B2 6/2021 Bouba et al.
11,063,891 B2 7/2021 Voss
11,069,103 B1 7/2021 Blackstock et al.
11,080,917 B2 8/2021 Monroy-hernández et al.
11,128,586 B2 9/2021 Al Majid et al.
11,166,123 B1 11/2021 Guillaume
11,188,190 B2 11/2021 Blackstock et al.
11,189,070 B2 11/2021 Jahangiri et al.
11,199,957 B1 12/2021 Alvi et al.
11,218,433 B2 1/2022 Baldwin et al.
11,229,849 B2 1/2022 Blackstock et al.
11,245,658 B2 2/2022 Grantham et al.
11,249,614 B2 2/2022 Brody
11,263,254 B2 3/2022 Baril et al.
11,270,491 B2 3/2022 Monroy-Hernández et al.
11,275,439 B2 3/2022 Jaureguiberry et al.
11,284,144 B2 3/2022 Kotsopoulos et al.
11,294,936 B1 4/2022 Jaureguiberry
11,307,747 B2 4/2022 Dancie et al.
11,616,745 B2 3/2023 Blackstock et al.
12,028,301 B2 7/2024 Blackstock et al.
2002/0047868 A1 4/2002 Miyazawa
2002/0067362 A1 6/2002 Agostino Nocera et al.
2002/0078456 A1 6/2002 Hudson et al.
2002/0087631 A1 7/2002 Sharma
2002/0097257 A1 7/2002 Miller et al.
2002/0122659 A1 9/2002 Mcgrath et al.
2002/0128047 A1 9/2002 Gates
2002/0144154 A1 10/2002 Tomkow
2002/0169644 A1 11/2002 Greene
2003/0001846 A1 1/2003 Davis et al.
2003/0016247 A1 1/2003 Lai et al.
2003/0017823 A1 1/2003 Mager et al.
2003/0020623 A1 1/2003 Cao et al.
2003/0023874 A1 1/2003 Prokupets et al.
2003/0037124 A1 2/2003 Yamaura et al.
2003/0052925 A1 3/2003 Daimon et al.
2003/0101230 A1 5/2003 Benschoter et al.
2003/0110503 A1 6/2003 Perkes
2003/0126215 A1 7/2003 Udell
2003/0148773 A1 8/2003 Spriestersbach et al.
2003/0164856 A1 9/2003 Prager et al.
2003/0229607 A1 12/2003 Zellweger et al.
2004/0027371 A1 2/2004 Jaeger
2004/0064429 A1 4/2004 Hirstius et al.
2004/0078367 A1 4/2004 Anderson et al.
2004/0111467 A1 6/2004 Willis
2004/0158739 A1 8/2004 Wakai et al.
2004/0189465 A1 9/2004 Capobianco et al.
2004/0203959 A1 10/2004 Coombes
2004/0215625 A1 10/2004 Svendsen et al.
2004/0221224 A1 11/2004 Blattner et al.
2004/0243531 A1 12/2004 Dean
2004/0243688 A1 12/2004 Wugofski
2005/0021444 A1 1/2005 Bauer et al.
2005/0022211 A1 1/2005 Veselov et al.
2005/0048989 A1 3/2005 Jung
2005/0078804 A1 4/2005 Yomoda
2005/0097176 A1 5/2005 Schatz et al.
2005/0102381 A1 5/2005 Jiang et al.
2005/0104976 A1 5/2005 Currans
2005/0114783 A1 5/2005 Szeto
2005/0119936 A1 6/2005 Buchanan et al.
2005/0122405 A1 6/2005 Voss et al.
2005/0162419 A1 7/2005 Kim et al.
2005/0193340 A1 9/2005 Amburgey et al.
2005/0193345 A1 9/2005 Klassen et al.
2005/0198128 A1 9/2005 Anderson
2005/0206610 A1 9/2005 Cordelli
2005/0223066 A1 10/2005 Buchheit et al.
2005/0223328 A1 10/2005 Ashtekar et al.
2005/0288954 A1 12/2005 McCarthy et al.
2006/0026067 A1 2/2006 Nicholas et al.
2006/0107297 A1 5/2006 Toyama et al.
2006/0114338 A1 6/2006 Rothschild
2006/0119882 A1 6/2006 Harris et al.
2006/0242239 A1 10/2006 Morishima et al.
2006/0252438 A1 11/2006 Ansamaa et al.
2006/0265417 A1 11/2006 Amato et al.
2006/0270419 A1 11/2006 Crowley et al.
2006/0287878 A1 12/2006 Wadhwa et al.
2006/0294465 A1 12/2006 Ronen et al.
2007/0004426 A1 1/2007 Pfleging et al.
2007/0038715 A1 2/2007 Collins et al.
2007/0040931 A1 2/2007 Nishizawa
2007/0073517 A1 3/2007 Panje
2007/0073823 A1 3/2007 Cohen et al.
2007/0075898 A1 4/2007 Markhovsky et al.
2007/0082707 A1 4/2007 Flynt et al.
2007/0113181 A1 5/2007 Blattner et al.
2007/0136228 A1 6/2007 Petersen
2007/0168863 A1 7/2007 Blattner et al.
2007/0176921 A1 8/2007 Iwasaki et al.
2007/0192128 A1 8/2007 Celestini
2007/0198340 A1 8/2007 Lucovsky et al.
2007/0198495 A1 8/2007 Buron et al.
2007/0208751 A1 9/2007 Cowan et al.
2007/0210936 A1 9/2007 Nicholson
2007/0214180 A1 9/2007 Crawford
2007/0214216 A1 9/2007 Carrer et al.
2007/0233556 A1 10/2007 Koningstein
2007/0233801 A1 10/2007 Eren et al.
2007/0233859 A1 10/2007 Zhao et al.
2007/0243887 A1 10/2007 Bandhole et al.
2007/0244750 A1 10/2007 Grannan et al.
2007/0255456 A1 11/2007 Funayama
2007/0281690 A1 12/2007 Altman et al.
2008/0022329 A1 1/2008 Glad
2008/0025701 A1 1/2008 Ikeda
2008/0032703 A1 2/2008 Krumm et al.
2008/0033930 A1 2/2008 Warren
2008/0043041 A2 2/2008 Hedenstroem et al.
2008/0049704 A1 2/2008 Witteman et al.
2008/0062141 A1 3/2008 Chandhri
2008/0076505 A1 3/2008 Ngyen et al.
2008/0092233 A1 4/2008 Tian et al.
2008/0094387 A1 4/2008 Chen
2008/0104503 A1 5/2008 Beall et al.
2008/0109844 A1 5/2008 Baldeschweiler et al.

(56) References Cited

U.S. PATENT DOCUMENTS

2008/0120409 A1 5/2008 Sun et al.
2008/0147730 A1 6/2008 Lee et al.
2008/0148150 A1 6/2008 Mall
2008/0158222 A1 7/2008 Li et al.
2008/0158230 A1 7/2008 Sharma et al.
2008/0168033 A1 7/2008 Ott et al.
2008/0168489 A1 7/2008 Schraga
2008/0189177 A1 8/2008 Anderton et al.
2008/0207176 A1 8/2008 Brackbill et al.
2008/0208692 A1 8/2008 Garaventi et al.
2008/0214210 A1 9/2008 Rasanen et al.
2008/0222545 A1 9/2008 Lemay
2008/0255976 A1 10/2008 Altberg et al.
2008/0256446 A1 10/2008 Yamamoto
2008/0256577 A1 10/2008 Funaki et al.
2008/0266421 A1 10/2008 Takahata et al.
2008/0270938 A1 10/2008 Carlson
2008/0288338 A1 11/2008 Wiseman et al.
2008/0306826 A1 12/2008 Kramer et al.
2008/0313329 A1 12/2008 Wang et al.
2008/0313346 A1 12/2008 Kujawa et al.
2008/0318616 A1 12/2008 Chipalkatti et al.
2009/0006191 A1 1/2009 Arankalle et al.
2009/0006565 A1 1/2009 Velusamy et al.
2009/0015703 A1 1/2009 Kim et al.
2009/0016617 A1 1/2009 Bregman-Amitai et al.
2009/0024956 A1 1/2009 Kobayashi
2009/0030774 A1 1/2009 Rothschild et al.
2009/0030999 A1 1/2009 Gatzke et al.
2009/0040324 A1 2/2009 Nonaka
2009/0042588 A1 2/2009 Lottin et al.
2009/0055484 A1 2/2009 Vuong et al.
2009/0058822 A1 3/2009 Chaudhri
2009/0070688 A1 3/2009 Gyorfi et al.
2009/0079846 A1 3/2009 Chou
2009/0089678 A1 4/2009 Sacco et al.
2009/0089710 A1 4/2009 Wood et al.
2009/0093261 A1 4/2009 Ziskind
2009/0099925 A1 4/2009 Mehta et al.
2009/0106672 A1 4/2009 Burstrom
2009/0132341 A1 5/2009 Klinger
2009/0132453 A1 5/2009 Hangartner et al.
2009/0132665 A1 5/2009 Thomsen et al.
2009/0148045 A1 6/2009 Lee et al.
2009/0153492 A1 6/2009 Popp
2009/0157450 A1 6/2009 Athsani et al.
2009/0157752 A1 6/2009 Gonzalez
2009/0158170 A1 6/2009 Narayanan et al.
2009/0160970 A1 6/2009 Fredlund et al.
2009/0163182 A1 6/2009 Gatti et al.
2009/0177299 A1 7/2009 Van De Sluis
2009/0177976 A1 7/2009 Bokor et al.
2009/0192900 A1 7/2009 Collision
2009/0199242 A1 8/2009 Johnson et al.
2009/0202114 A1 8/2009 Morin et al.
2009/0215469 A1 8/2009 Fisher et al.
2009/0232354 A1 9/2009 Camp, Jr. et al.
2009/0234815 A1 9/2009 Boerries et al.
2009/0239552 A1 9/2009 Churchill et al.
2009/0249222 A1 10/2009 Schmidt et al.
2009/0249244 A1 10/2009 Robinson et al.
2009/0254859 A1* 10/2009 Arrasvuori ............ G06Q 10/10 715/810
2009/0265604 A1 10/2009 Howard et al.
2009/0265647 A1 10/2009 Martin et al.
2009/0288022 A1 11/2009 Almstrand et al.
2009/0291672 A1 11/2009 Treves et al.
2009/0292608 A1 11/2009 Polachek
2009/0300139 A1* 12/2009 Shoemaker ............ H04L 67/06 709/217
2009/0300525 A1 12/2009 Jolliff et al.
2009/0303984 A1 12/2009 Clark et al.
2009/0319607 A1 12/2009 Belz et al.
2009/0327073 A1 12/2009 Li
2010/0004008 A1 1/2010 Abolrous et al.
2010/0011422 A1 1/2010 Mason et al.
2010/0023885 A1 1/2010 Reville et al.
2010/0062794 A1 3/2010 Han
2010/0070999 A1 3/2010 Morris et al.
2010/0082427 A1 4/2010 Burgener et al.
2010/0082693 A1 4/2010 Hugg et al.
2010/0100568 A1 4/2010 Papin et al.
2010/0113065 A1 5/2010 Narayan et al.
2010/0115426 A1 5/2010 Liu et al.
2010/0130233 A1 5/2010 Parker
2010/0131880 A1 5/2010 Lee et al.
2010/0131895 A1 5/2010 Wohlert
2010/0153144 A1 6/2010 Miller et al.
2010/0159944 A1 6/2010 Pascal et al.
2010/0161658 A1 6/2010 Hamynen et al.
2010/0161831 A1 6/2010 Haas et al.
2010/0162149 A1 6/2010 Sheleheda et al.
2010/0183280 A1 7/2010 Beauregard et al.
2010/0185552 A1 7/2010 Deluca et al.
2010/0185665 A1 7/2010 Horn et al.
2010/0191631 A1 7/2010 Weidmann
2010/0197318 A1 8/2010 Petersen et al.
2010/0197319 A1 8/2010 Petersen et al.
2010/0198683 A1 8/2010 Aarabi
2010/0198694 A1 8/2010 Muthukrishnan
2010/0198826 A1 8/2010 Petersen et al.
2010/0198828 A1 8/2010 Petersen et al.
2010/0198862 A1 8/2010 Jennings et al.
2010/0198870 A1 8/2010 Petersen et al.
2010/0198917 A1 8/2010 Petersen et al.
2010/0201482 A1 8/2010 Robertson et al.
2010/0201536 A1 8/2010 Robertson et al.
2010/0203968 A1 8/2010 Gill et al.
2010/0214436 A1 8/2010 Kim et al.
2010/0223128 A1 9/2010 Dukellis et al.
2010/0223343 A1 9/2010 Bosan et al.
2010/0227682 A1 9/2010 Reville et al.
2010/0250109 A1 9/2010 Johnston et al.
2010/0257196 A1 10/2010 Waters et al.
2010/0259386 A1 10/2010 Holley et al.
2010/0273509 A1 10/2010 Sweeney et al.
2010/0281045 A1 11/2010 Dean
2010/0306669 A1 12/2010 Della Pasqua
2011/0004071 A1 1/2011 Faiola et al.
2011/0010205 A1 1/2011 Richards
2011/0029512 A1 2/2011 Folgner et al.
2011/0040783 A1 2/2011 Uemichi et al.
2011/0040804 A1 2/2011 Peirce et al.
2011/0050909 A1 3/2011 Ellenby et al.
2011/0050915 A1 3/2011 Wang et al.
2011/0064388 A1 3/2011 Brown et al.
2011/0066743 A1 3/2011 Hurley et al.
2011/0083101 A1 4/2011 Sharon et al.
2011/0090301 A1 4/2011 Aaron et al.
2011/0093780 A1 4/2011 Dunn
2011/0102630 A1 5/2011 Rukes
2011/0115798 A1 5/2011 Nayar et al.
2011/0119133 A1 5/2011 Igelman et al.
2011/0137881 A1 6/2011 Cheng et al.
2011/0145564 A1 6/2011 Moshir et al.
2011/0148864 A1 6/2011 Lee et al.
2011/0159890 A1 6/2011 Fortescue et al.
2011/0161856 A1 6/2011 Nurmi et al.
2011/0164163 A1 7/2011 Bilbrey et al.
2011/0197194 A1 8/2011 D'Angelo et al.
2011/0202598 A1 8/2011 Evans et al.
2011/0202968 A1 8/2011 Nurmi
2011/0211534 A1 9/2011 Schmidt et al.
2011/0213845 A1 9/2011 Logan et al.
2011/0215966 A1 9/2011 Kim et al.
2011/0225048 A1 9/2011 Nair
2011/0238763 A1 9/2011 Shin et al.
2011/0239136 A1 9/2011 Goldman et al.
2011/0255736 A1 10/2011 Thompson et al.
2011/0273575 A1 11/2011 Lee
2011/0282799 A1 11/2011 Huston
2011/0283188 A1 11/2011 Farrenkopf
2011/0314419 A1 12/2011 Dunn et al.
2011/0320373 A1 12/2011 Lee et al.

(56) References Cited

U.S. PATENT DOCUMENTS

2012/0028659 A1 2/2012 Whitney et al.
2012/0033718 A1 2/2012 Kauffman et al.
2012/0036015 A1 2/2012 Sheikh
2012/0036443 A1 2/2012 Ohmori et al.
2012/0054797 A1 3/2012 Skog et al.
2012/0059722 A1 3/2012 Rao
2012/0062805 A1 3/2012 Candelore
2012/0084731 A1 4/2012 Filman et al.
2012/0084835 A1 4/2012 Thomas et al.
2012/0099800 A1 4/2012 Llano et al.
2012/0108293 A1 5/2012 Law et al.
2012/0110096 A1 5/2012 Smarr et al.
2012/0113106 A1 5/2012 Choi et al.
2012/0113143 A1 5/2012 Adhikari et al.
2012/0113272 A1 5/2012 Hata
2012/0123830 A1 5/2012 Svendsen et al.
2012/0123871 A1 5/2012 Svendsen et al.
2012/0123875 A1 5/2012 Svendsen et al.
2012/0124126 A1 5/2012 Alcazar et al.
2012/0124176 A1 5/2012 Curtis et al.
2012/0124458 A1 5/2012 Cruzada
2012/0130717 A1 5/2012 Xu et al.
2012/0131507 A1 5/2012 Sparandara et al.
2012/0131512 A1 5/2012 Takeuchi et al.
2012/0143760 A1 6/2012 Abulafia et al.
2012/0150978 A1 6/2012 Monaco
2012/0165100 A1 6/2012 Lalancette et al.
2012/0166971 A1 6/2012 Sachson et al.
2012/0169855 A1 7/2012 Oh
2012/0172062 A1 7/2012 Altman et al.
2012/0173991 A1 7/2012 Roberts et al.
2012/0176401 A1 7/2012 Hayward et al.
2012/0184248 A1 7/2012 Speede
2012/0197724 A1 8/2012 Kendall
2012/0200743 A1 8/2012 Blanchflower et al.
2012/0209924 A1 8/2012 Evans et al.
2012/0210244 A1 8/2012 De Francisco et al.
2012/0212632 A1 8/2012 Mate et al.
2012/0220264 A1 8/2012 Kawabata
2012/0226748 A1 9/2012 Bosworth et al.
2012/0233000 A1 9/2012 Fisher et al.
2012/0236162 A1 9/2012 Imamura
2012/0239761 A1 9/2012 Linner et al.
2012/0250951 A1 10/2012 Chen
2012/0252418 A1 10/2012 Kandekar et al.
2012/0254325 A1 10/2012 Majeti et al.
2012/0270578 A1 10/2012 Feghali
2012/0278387 A1 11/2012 Garcia et al.
2012/0278692 A1 11/2012 Shi
2012/0290637 A1 11/2012 Perantatos et al.
2012/0299954 A1 11/2012 Wada et al.
2012/0304052 A1 11/2012 Tanaka et al.
2012/0304080 A1 11/2012 Wormald et al.
2012/0307096 A1 12/2012 Ford et al.
2012/0307112 A1 12/2012 Kunishige et al.
2012/0319904 A1 12/2012 Lee et al.
2012/0323933 A1 12/2012 He et al.
2012/0324018 A1 12/2012 Metcalf et al.
2013/0006759 A1 1/2013 Srivastava et al.
2013/0024757 A1 1/2013 Doll et al.
2013/0036364 A1 2/2013 Johnson
2013/0045753 A1 2/2013 Obermeyer et al.
2013/0050260 A1 2/2013 Reitan
2013/0055083 A1 2/2013 Fino
2013/0057587 A1 3/2013 Leonard et al.
2013/0059607 A1 3/2013 Herz et al.
2013/0060690 A1 3/2013 Oskolkov et al.
2013/0063369 A1 3/2013 Malhotra et al.
2013/0067027 A1 3/2013 Song et al.
2013/0071093 A1 3/2013 Hanks et al.
2013/0080254 A1 3/2013 Thramann
2013/0085790 A1 4/2013 Palmer et al.
2013/0086072 A1 4/2013 Peng et al.
2013/0090171 A1 4/2013 Holton et al.
2013/0095857 A1 4/2013 Garcia et al.
2013/0103760 A1 4/2013 Golding et al.
2013/0104053 A1 4/2013 Thornton et al.
2013/0110885 A1 5/2013 Brundrett, III
2013/0111514 A1 5/2013 Slavin et al.
2013/0128059 A1 5/2013 Kristensson
2013/0129252 A1 5/2013 Lauper
2013/0132477 A1 5/2013 Bosworth et al.
2013/0145286 A1 6/2013 Feng et al.
2013/0159110 A1 6/2013 Rajaram et al.
2013/0159919 A1 6/2013 Leydon
2013/0169822 A1 7/2013 Zhu et al.
2013/0173729 A1 7/2013 Starenky et al.
2013/0182133 A1 7/2013 Tanabe
2013/0185131 A1 7/2013 Sinha et al.
2013/0191198 A1 7/2013 Carlson et al.
2013/0194301 A1 8/2013 Robbins et al.
2013/0198176 A1 8/2013 Kim
2013/0201187 A1 8/2013 Tong et al.
2013/0218965 A1 8/2013 Abrol et al.
2013/0218968 A1 8/2013 Mcevilly et al.
2013/0222323 A1 8/2013 Mckenzie
2013/0227476 A1 8/2013 Frey
2013/0232194 A1 9/2013 Knapp et al.
2013/0249948 A1 9/2013 Reitan
2013/0257877 A1 10/2013 Davis
2013/0258040 A1 10/2013 Kaytaz et al.
2013/0263031 A1 10/2013 Oshiro et al.
2013/0265450 A1 10/2013 Barnes, Jr.
2013/0267253 A1 10/2013 Case et al.
2013/0275505 A1 10/2013 Gauglitz et al.
2013/0290443 A1 10/2013 Collins et al.
2013/0304646 A1 11/2013 De Geer
2013/0311255 A1 11/2013 Cummins et al.
2013/0325964 A1 12/2013 Berberat
2013/0326373 A1 12/2013 Lisabeth et al.
2013/0344896 A1 12/2013 Kirmse et al.
2013/0346869 A1 12/2013 Asver et al.
2013/0346877 A1 12/2013 Borovoy et al.
2014/0006129 A1 1/2014 Heath
2014/0011538 A1 1/2014 Mulcahy et al.
2014/0019264 A1 1/2014 Wachman et al.
2014/0032682 A1 1/2014 Prado et al.
2014/0043204 A1 2/2014 Basnayake et al.
2014/0043329 A1 2/2014 Wang et al.
2014/0045530 A1 2/2014 Gordon et al.
2014/0047016 A1 2/2014 Rao
2014/0047045 A1 2/2014 Baldwin et al.
2014/0047335 A1 2/2014 Lewis et al.
2014/0049652 A1 2/2014 Moon et al.
2014/0052485 A1 2/2014 Shidfar
2014/0052633 A1 2/2014 Gandhi
2014/0055554 A1 2/2014 Du et al.
2014/0057660 A1 2/2014 Wager
2014/0082651 A1 3/2014 Sharifi
2014/0092130 A1 4/2014 Anderson et al.
2014/0096029 A1 4/2014 Schultz
2014/0114565 A1 4/2014 Aziz et al.
2014/0122658 A1 5/2014 Haeger et al.
2014/0122787 A1 5/2014 Shalvi et al.
2014/0125678 A1 5/2014 Wang et al.
2014/0129343 A1 5/2014 Finster et al.
2014/0129953 A1 5/2014 Spiegel
2014/0143143 A1 5/2014 Fasoli et al.
2014/0143682 A1 5/2014 Druck
2014/0149519 A1 5/2014 Redfern et al.
2014/0155102 A1 6/2014 Cooper et al.
2014/0173424 A1 6/2014 Hogeg et al.
2014/0173457 A1 6/2014 Wang et al.
2014/0189592 A1 7/2014 Benchenaa et al.
2014/0207679 A1 7/2014 Cho
2014/0214471 A1 7/2014 Schreiner, III
2014/0222564 A1 8/2014 Kranendonk et al.
2014/0258405 A1 9/2014 Perkin
2014/0265359 A1 9/2014 Cheng et al.
2014/0266703 A1 9/2014 Dalley, Jr. et al.
2014/0279061 A1 9/2014 Elimeliah et al.
2014/0279436 A1 9/2014 Dorsey et al.
2014/0279540 A1 9/2014 Jackson
2014/0280537 A1 9/2014 Pridmore et al.

(56) References Cited

U.S. PATENT DOCUMENTS

| | | | |
|---|---|---|---|
| 2014/0282096 | A1 | 9/2014 | Rubinstein et al. |
| 2014/0287779 | A1 | 9/2014 | O'Keefe et al. |
| 2014/0289833 | A1 | 9/2014 | Briceno |
| 2014/0306986 | A1 | 10/2014 | Gottesman et al. |
| 2014/0317302 | A1 | 10/2014 | Naik |
| 2014/0324627 | A1 | 10/2014 | Haver et al. |
| 2014/0324629 | A1 | 10/2014 | Jacobs |
| 2014/0325383 | A1 | 10/2014 | Brown et al. |
| 2014/0351720 | A1 | 11/2014 | Yin |
| 2015/0020086 | A1 | 1/2015 | Chen et al. |
| 2015/0032829 | A1* | 1/2015 | Barshow ............... H04L 51/216 709/206 |
| 2015/0046278 | A1 | 2/2015 | Pei et al. |
| 2015/0071619 | A1 | 3/2015 | Brough |
| 2015/0087263 | A1 | 3/2015 | Branscomb et al. |
| 2015/0088622 | A1 | 3/2015 | Ganschow et al. |
| 2015/0095020 | A1 | 4/2015 | Leydon |
| 2015/0096042 | A1 | 4/2015 | Mizrachi |
| 2015/0100647 | A1 | 4/2015 | Agustin et al. |
| 2015/0116529 | A1 | 4/2015 | Wu et al. |
| 2015/0121251 | A1 | 4/2015 | Kadirvel et al. |
| 2015/0169827 | A1 | 6/2015 | Laborde |
| 2015/0172534 | A1 | 6/2015 | Miyakawa et al. |
| 2015/0178260 | A1 | 6/2015 | Brunson |
| 2015/0178388 | A1 | 6/2015 | Winnemoeller et al. |
| 2015/0206349 | A1 | 7/2015 | Rosenthal et al. |
| 2015/0222814 | A1 | 8/2015 | Li et al. |
| 2015/0261917 | A1 | 9/2015 | Smith |
| 2015/0312184 | A1 | 10/2015 | Langholz et al. |
| 2015/0350136 | A1 | 12/2015 | Flynn, III et al. |
| 2015/0365795 | A1 | 12/2015 | Allen et al. |
| 2015/0378502 | A1 | 12/2015 | Hu et al. |
| 2016/0006927 | A1 | 1/2016 | Sehn |
| 2016/0014063 | A1 | 1/2016 | Hogeg et al. |
| 2016/0085773 | A1 | 3/2016 | Chang et al. |
| 2016/0085863 | A1 | 3/2016 | Allen et al. |
| 2016/0099901 | A1 | 4/2016 | Allen et al. |
| 2016/0132516 | A1* | 5/2016 | Greenberg ............ G06F 16/958 715/202 |
| 2016/0132970 | A1* | 5/2016 | Greenberg ............ G06Q 40/08 705/4 |
| 2016/0134840 | A1 | 5/2016 | Mcculloch |
| 2016/0180887 | A1 | 6/2016 | Sehn |
| 2016/0182422 | A1 | 6/2016 | Sehn et al. |
| 2016/0182875 | A1 | 6/2016 | Sehn |
| 2016/0189238 | A1* | 6/2016 | Law .................. G06Q 30/0269 705/14.66 |
| 2016/0234149 | A1 | 8/2016 | Tsuda et al. |
| 2016/0239248 | A1 | 8/2016 | Sehn |
| 2016/0259502 | A1 | 9/2016 | Parrott |
| 2016/0277419 | A1 | 9/2016 | Allen et al. |
| 2016/0321708 | A1 | 11/2016 | Sehn |
| 2016/0344668 | A1 | 11/2016 | Young et al. |
| 2016/0359777 | A1* | 12/2016 | Tucker .................... H04L 51/04 |
| 2016/0361653 | A1* | 12/2016 | Zhang .................. A63F 13/332 |
| 2017/0006094 | A1 | 1/2017 | Abou Mahmoud et al. |
| 2017/0048184 | A1 | 2/2017 | Lewis et al. |
| 2017/0061308 | A1 | 3/2017 | Chen et al. |
| 2017/0080346 | A1 | 3/2017 | Abbas |
| 2017/0087473 | A1 | 3/2017 | Siegel et al. |
| 2017/0111303 | A1 | 4/2017 | Nesbitt |
| 2017/0113140 | A1 | 4/2017 | Blackstock et al. |
| 2017/0118145 | A1 | 4/2017 | Aittoniemi et al. |
| 2017/0185581 | A1 | 6/2017 | Bojja et al. |
| 2017/0199855 | A1 | 7/2017 | Fishbeck |
| 2017/0235848 | A1 | 8/2017 | Van Dusen et al. |
| 2017/0287006 | A1 | 10/2017 | Azmoodeh et al. |
| 2017/0310934 | A1 | 10/2017 | Du et al. |
| 2017/0312634 | A1 | 11/2017 | Ledoux et al. |
| 2017/0344224 | A1 | 11/2017 | Kay et al. |
| 2018/0026925 | A1 | 1/2018 | Kennedy |
| 2018/0047200 | A1 | 2/2018 | O'Hara et al. |
| 2018/0113587 | A1 | 4/2018 | Allen et al. |
| 2018/0115503 | A1 | 4/2018 | Baldwin et al. |
| 2018/0198743 | A1 | 7/2018 | Blackstock et al. |
| 2018/0226069 | A1 | 8/2018 | Fleischman et al. |
| 2018/0309703 | A1 | 10/2018 | Ihara |
| 2018/0315076 | A1 | 11/2018 | Andreou |
| 2018/0315133 | A1 | 11/2018 | Brody et al. |
| 2018/0315134 | A1 | 11/2018 | Amitay et al. |
| 2019/0001223 | A1 | 1/2019 | Blackstock et al. |
| 2019/0057616 | A1 | 2/2019 | Cohen et al. |
| 2019/0097958 | A1 | 3/2019 | Collet et al. |
| 2019/0188920 | A1 | 6/2019 | Mcphee et al. |
| 2019/0280997 | A1 | 9/2019 | Baldwin et al. |
| 2020/0306637 | A1 | 10/2020 | Baldwin et al. |
| 2020/0314586 | A1 | 10/2020 | Bouba et al. |
| 2020/0372127 | A1 | 11/2020 | Denton et al. |
| 2020/0382912 | A1 | 12/2020 | Dancie et al. |
| 2020/0401225 | A1 | 12/2020 | Jaureguiberry et al. |
| 2020/0410575 | A1 | 12/2020 | Grantham et al. |
| 2021/0011612 | A1 | 1/2021 | Dancie et al. |
| 2021/0074047 | A1 | 3/2021 | Sheth et al. |
| 2021/0089179 | A1 | 3/2021 | Grantham et al. |
| 2021/0104087 | A1 | 4/2021 | Smith et al. |
| 2021/0152979 | A1 | 5/2021 | Berardino et al. |
| 2021/0168108 | A1 | 6/2021 | Antmen et al. |
| 2021/0170270 | A1 | 6/2021 | Brody et al. |
| 2021/0192823 | A1 | 6/2021 | Amitay et al. |
| 2021/0209825 | A1 | 7/2021 | Assouline et al. |
| 2021/0225058 | A1 | 7/2021 | Chand et al. |
| 2021/0240315 | A1 | 8/2021 | Alvi et al. |
| 2021/0243482 | A1 | 8/2021 | Baril et al. |
| 2021/0266277 | A1 | 8/2021 | Allen et al. |
| 2021/0266704 | A1 | 8/2021 | Dancie et al. |
| 2021/0281897 | A1 | 9/2021 | Brody et al. |
| 2021/0285774 | A1 | 9/2021 | Collins et al. |
| 2021/0306290 | A1 | 9/2021 | Voss |
| 2021/0306451 | A1 | 9/2021 | Heikkinen et al. |
| 2021/0377693 | A1 | 12/2021 | Bouba et al. |
| 2021/0385180 | A1 | 12/2021 | Al Majid et al. |
| 2021/0405831 | A1 | 12/2021 | Mourkogiannis et al. |
| 2021/0409535 | A1 | 12/2021 | Mourkogiannis et al. |
| 2021/0409904 | A1 | 12/2021 | Baylin et al. |
| 2022/0012929 | A1 | 1/2022 | Blackstock et al. |
| 2022/0174455 | A1 | 6/2022 | Guillaume |
| 2022/0269345 | A1 | 8/2022 | Jaureguiberry et al. |
| 2023/0188490 | A1 | 6/2023 | Blackstock et al. |

FOREIGN PATENT DOCUMENTS

| | | | |
|---|---|---|---|
| CN | 103559627 | A | 2/2014 |
| CN | 109863532 | A | 6/2019 |
| CN | 110168478 | A | 8/2019 |
| CN | 110168586 | A | 8/2019 |
| CN | 110168586 | B | 3/2024 |
| EP | 2051480 | A1 | 4/2009 |
| EP | 2151797 | A1 | 2/2010 |
| EP | 2184092 | A2 | 5/2010 |
| GB | 2399928 | A | 9/2004 |
| JP | 2001230801 | A | 8/2001 |
| JP | 5497931 | B2 | 3/2014 |
| KR | 19990073076 | A | 10/1999 |
| KR | 20010078417 | A | 8/2001 |
| KR | 101445263 | B1 | 9/2014 |
| KR | 102248095 | B1 | 5/2021 |
| KR | 102330665 | B1 | 11/2021 |
| WO | WO-1996024213 | A1 | 8/1996 |
| WO | WO-1999063453 | A1 | 12/1999 |
| WO | WO-2000058882 | A1 | 10/2000 |
| WO | WO-2001029642 | A1 | 4/2001 |
| WO | WO-2001050703 | A3 | 7/2001 |
| WO | WO-2003094072 | A1 | 11/2003 |
| WO | WO-2004095308 | A1 | 11/2004 |
| WO | WO-2006107182 | A1 | 10/2006 |
| WO | WO-2006118755 | A2 | 11/2006 |
| WO | WO-2007092668 | A2 | 8/2007 |
| WO | WO-2007134402 | A1 | 11/2007 |
| WO | WO-2009043020 | A2 | 4/2009 |
| WO | WO-2011040821 | A1 | 4/2011 |
| WO | WO-2011119407 | A1 | 9/2011 |
| WO | WO-2012139276 | A1 | 10/2012 |
| WO | WO-2013008238 | A1 | 1/2013 |
| WO | WO-2013027893 | A1 | 2/2013 |

(56) References Cited

FOREIGN PATENT DOCUMENTS

| | | |
|---|---|---|
| WO | WO-2013045753 A1 | 4/2013 |
| WO | WO-2013152454 A1 | 10/2013 |
| WO | WO-2013166588 A1 | 11/2013 |
| WO | WO-2014006129 A1 | 1/2014 |
| WO | WO-2014031899 A1 | 2/2014 |
| WO | WO-2014068573 A1 | 5/2014 |
| WO | WO-2014115136 A1 | 7/2014 |
| WO | WO-2014194262 A2 | 12/2014 |
| WO | WO-2014194439 A1 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016090605 A1 | 6/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |
| WO | WO-2018081013 A1 | 5/2018 |
| WO | WO-2018102562 A1 | 6/2018 |
| WO | WO-2018128941 | 7/2018 |
| WO | WO-2018129531 A1 | 7/2018 |
| WO | WO-2019089613 A1 | 5/2019 |

OTHER PUBLICATIONS

"Adding photos to your listing", eBay, [Online] Retrieved from the Internet: <URL: http://pages.ebay.com/help/sell/pictures.html>, (accessed May 24, 2017), 4 pgs.
"U.S. Appl. No. 15/486,117, Corrected Notice of Allowability mailed Mar. 1, 2023", 3 pgs.
"U.S. Appl. No. 15/486,117, Final Office Action mailed Apr. 14, 2022", 12 pgs.
"U.S. Appl. No. 15/486,117, Final Office Action mailed Oct. 29, 2020", 14 pgs.
"U.S. Appl. No. 15/486,117, Final Office Action mailed Nov. 29, 2019", 14 pgs.
"U.S. Appl. No. 15/486,117, Non Final Office Action mailed Feb. 25, 2019", 13 pgs.
"U.S. Appl. No. 15/486,117, Non Final Office Action mailed Jun. 25, 2020", 14 pgs.
"U.S. Appl. No. 15/486,117, Non Final Office Action mailed Aug. 5, 2021", 14 pgs.
"U.S. Appl. No. 15/486,117, Notice of Allowance mailed Oct. 5, 2022", 6 pgs.
"U.S. Appl. No. 15/486,117, Response filed Jan. 5, 2022 to Non Final Office Action mailed Aug. 5, 2021", 14 pgs.
"U.S. Appl. No. 15/486,117, Response filed Mar. 2, 2020 to Final Office Action mailed Nov. 29, 2019", 12 pgs.
"U.S. Appl. No. 15/486,117, Response filed Mar. 29, 2021 to Final Office Action mailed Oct. 29, 2020", 12 pgs.
"U.S. Appl. No. 15/486,117, Response filed Aug. 15, 2022 to Final Office Action mailed Apr. 14, 2022", 12 pgs.
"U.S. Appl. No. 15/486,117, Response filed Sep. 25, 2020 to Non Final Office Action mailed Jun. 25, 2020", 11 pgs.
"U.S. Appl. No. 15/486,117, Response filed Aug. 23, 2019 to Non-Final Office Action mailed Feb. 25, 2019", 11 pgs.
"U.S. Appl. No. 18/162,531, Corrected Notice of Allowability mailed Mar. 6, 2024", 3 pgs.
"U.S. Appl. No. 18/162,531, Non Final Office Action mailed Oct. 4, 2023", 14 pgs.
"U.S. Appl. No. 18/162,531, Notice of Allowance mailed Feb. 28, 2024", 7 pgs.
"U.S. Appl. No. 18/162,531, Response filed Feb. 5, 2024 to Non Final Office Action mailed Oct. 4, 2023", 12 pgs.
"BlogStomp", StompSoftware, [Online] Retrieved from the Internet: <URL: http://stompsoftware.com/blogstomp>, (accessed May 24, 2017), 12 pgs.
"Chinese Application Serial No. 201780082603.2, Office Action mailed Jun. 25, 2023", W/English Translation, 16 pgs.
"Chinese Application Serial No. 201780082603.2, Office Action mailed Dec. 5, 2022", W/English Translation, 14 pgs.
"Chinese Application Serial No. 201780082603.2, Response filed Apr. 20, 2023 to Office Action mailed Dec. 5, 2022", w/ English claims, 38 pgs.
"Chinese Application Serial No. 201780082603.2, Response filed Nov. 10, 2023 to Office Action mailed Jun. 25, 2023", w/ English claims, 15 pgs.
"Chinese Application Serial No. 201780082603.2, Response to Telephone Examiner Interview filed Dec. 4, 2023", w/ English claims, 11 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"European Application Serial No. 17836079.8, Communication Pursuant to Article 94(3) EPC mailed Aug. 14, 2020", 4 pgs.
"European Application Serial No. 17836079.8, Response filed Feb. 24, 2021 to Communication Pursuant to Article 94(3) EPC mailed Aug. 14, 2020", 18 pgs.
"European Application Serial No. 17836079.8, Response filed Feb. 28, 2020 to Communication Pursuant to Rules 161(1) mailed Aug. 19, 2019", 22 pgs.
"European Application Serial No. 17836079.8, Summons to attend oral proceedings mailed Jan. 7, 2022", 11 pgs.
"European Application Serial No. 22211528.9, Extended European Search Report mailed Feb. 24, 2023", 8 pgs.
"InstaPlace Photo App Tell the Whole Story", [Online] Retrieved from the Internet: <URL: youtu.be/uF_gFkglhBM>, (Nov. 8, 2013), 113 pgs., 1:02 min.
"International Application Serial No. PCT/US2015/037251, International Search Report mailed Sep. 29, 2015", 2 pgs.
"International Application Serial No. PCT/US2017/069077, International Preliminary Report on Patentability mailed Jul. 18, 2019", 10 pgs.
"International Application Serial No. PCT/US2017/069077, International Search Report mailed Mar. 26, 2018", 4 pgs.
"International Application Serial No. PCT/US2017/069077, Written Opinion mailed Mar. 26, 2018", 8 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Korean Application Serial No. 10-2019-7023061, Notice of Preliminary Rejection mailed Jul. 7, 2020", W/English Translation, 10 pgs.
"Korean Application Serial No. 10-2019-7023061, Response filed Nov. 6, 2020 to Notice of Preliminary Rejection mailed Jul. 7, 2020", w/ English Claims, 27 pgs.
"Korean Application Serial No. 10-2021-7012876, Notice of Preliminary Rejection mailed May 18, 2021", w/ English Translation, 5 pgs.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXi9RGOw>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

(56) References Cited

OTHER PUBLICATIONS

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term=. bkQ9qVZWe#.nv58YXpkV>, (Dec. 22, 2013), 13 pgs.
Panzarino, Matthew, "Snapchat Adds Filters, A Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.
"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.
"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.
"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.
"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.
"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.
"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.
"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.
Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.
Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.
Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.
Macmillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.
Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.
Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.
Reign, Ashley, "How to Add My Friend's Bitmoji to My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.
Tumbokon, Karen, "Snapchat Update: How to Add Bitmoji to Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.

* cited by examiner

CONTEXTUAL GENERATION AND SELECTION OF CUSTOMIZED MEDIA CONTENT

CLAIM OF PRIORITY

This application is a continuation of U.S. patent application Ser. No. 18/162,531, filed on Jan. 31, 2023, now issued as U.S. Pat. No. 12,028,301, which is a continuation of U.S. patent application Ser. No. 15/486,117, filed on Apr. 12, 2017, now issued as U.S. Pat. No. 11,616,745, which claims the benefit of priority to U.S. Provisional Application Ser. No. 62/443,996, filed on Jan. 9, 2017, each of which are incorporated herein by reference in their entireties.

BACKGROUND

The popularity of electronic messaging, particularly instant messaging, continues to grow. Users increasingly use "emoji" (which are ideograms and icons) within electronic messages such as texts and emails, reflecting a global demand to communicate more visually. However, conventional emoji and similar graphics are typically generic and lacking in diversity: every individual user is represented by the same set of faces, irrespective of appearance, gender or ethnicity. Furthermore, every conversation that uses conventional emoji looks identical, and there is no visual personality or cue to identify the participants or distinguish one interaction from the next. Embodiments of the present disclosure address these and other issues.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of electronic messaging software and systems by generating and selecting customized media content items (such as images) with avatars of different users within electronic messages based on the context of communications between the users. For example, users of different mobile computing devices can exchange electronic communications with each other, and the system can analyze these communications to present options for media content items containing the users' avatars based on content in the communications, actions or events taken by or involving the users, or combinations thereof. The users may select such media content items for inclusion in their electronic communications.

In some embodiments, images may be generated that contain avatars of users who exchange electronic communications, such as short message service (SMS) or multimedia message service (MMS) texts and emails. Such images may be automatically generated based on the history of communications between users, the users' locations, and events the users are engaged in. The appearance of users' avatars may likewise be modified based on location and event information.

In some embodiments, images and other content that is received by a computing device may be analyzed to identify features of the content, such as the tone of a message. Based on the identified features, response images (e.g., containing one or more user avatars) can be generated appropriate to the content or communication history between users.

Figure 1:
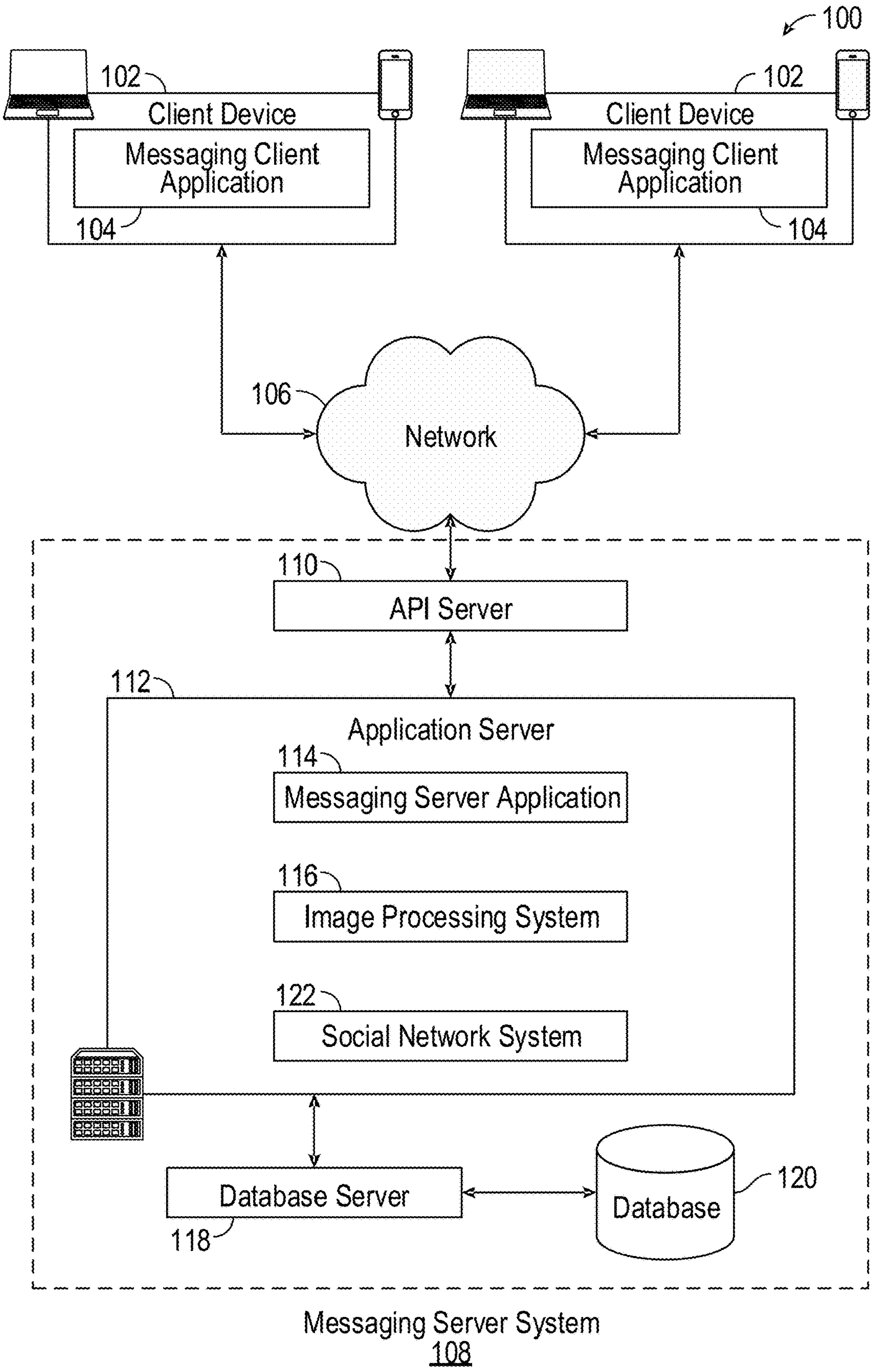
FIG. 1 is a block diagram showing an example messaging system for exchanging data (e.g., messages and associated content) over a network.

FIG. 1 is a block diagram showing an example of a messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces to a communications network (such as network 106) to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

In the example shown in FIG. 1, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content including images and video clips) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Some embodiments may include one or more wearable devices, such as a pendant with an integrated camera that is integrated with, in communication with, or coupled to, a client device 102. Any desired wearable device may be used in conjunction with the embodiments of the present disclosure, such as a watch, eyeglasses, goggles, a headset, a wristband, carbuds, clothing (such as a hat or jacket with integrated electronics), a clip-on electronic device, as well as any other wearable devices.

Figure 2:
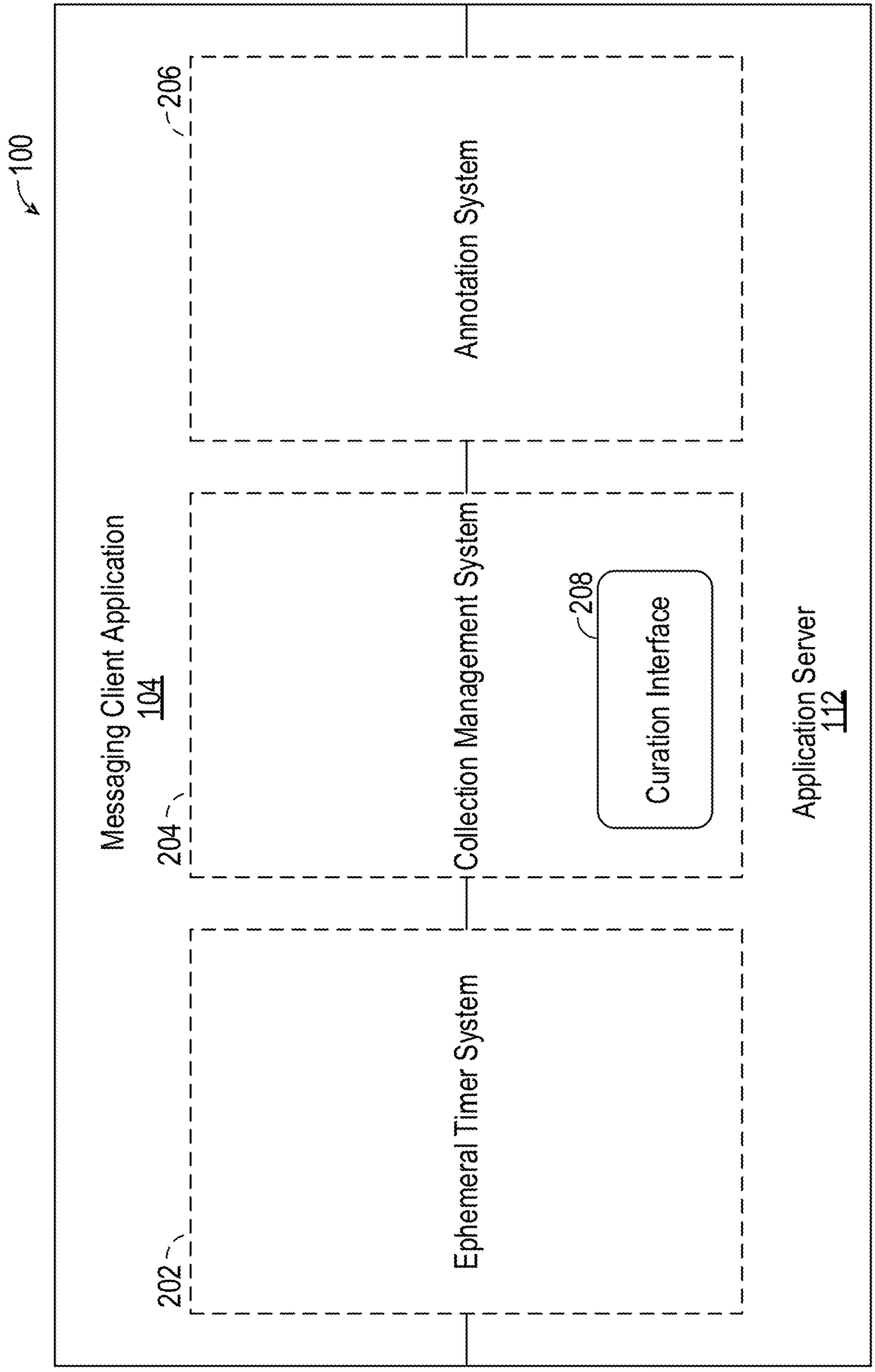
FIG. 2 is block diagram illustrating further details regarding a messaging system, according to exemplary embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the messaging client application 104.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
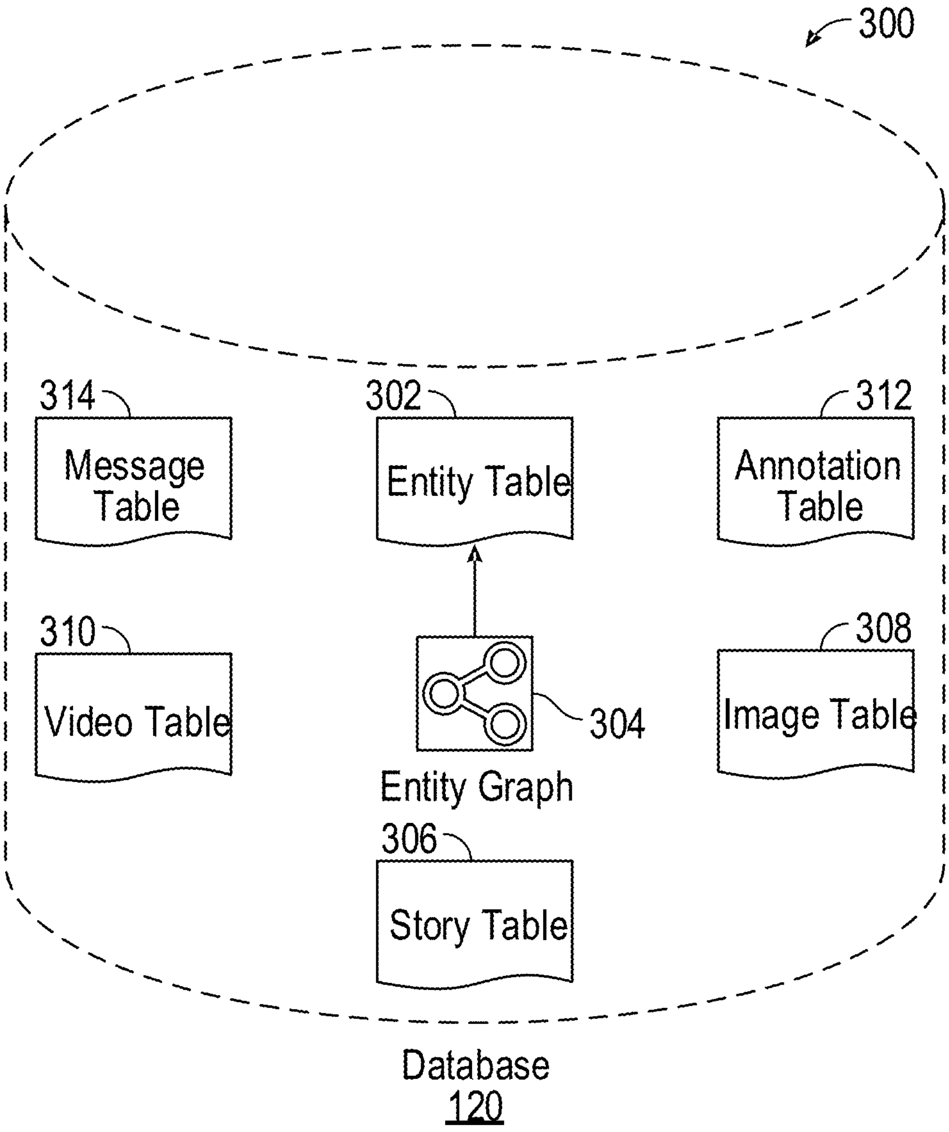
FIG. 3 is a schematic diagram illustrating data which may be stored in the database of the messaging server system, according to various exemplary embodiments.

In another exemplary embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data 300 which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310), images (for which data is stored in an image table 308), or both. Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Embodiments of the present disclosure may generate and present customized media content items (such as images, video, etc.) for use within electronic messages/communications such as short message service (SMS) or multimedia message service (MMS) texts and emails. The customized images may also be utilized in conjunction with the SNAPCHAT stories, SNAPCHAT filters, and ephemeral messaging functionality discussed herein.

Figure 4:
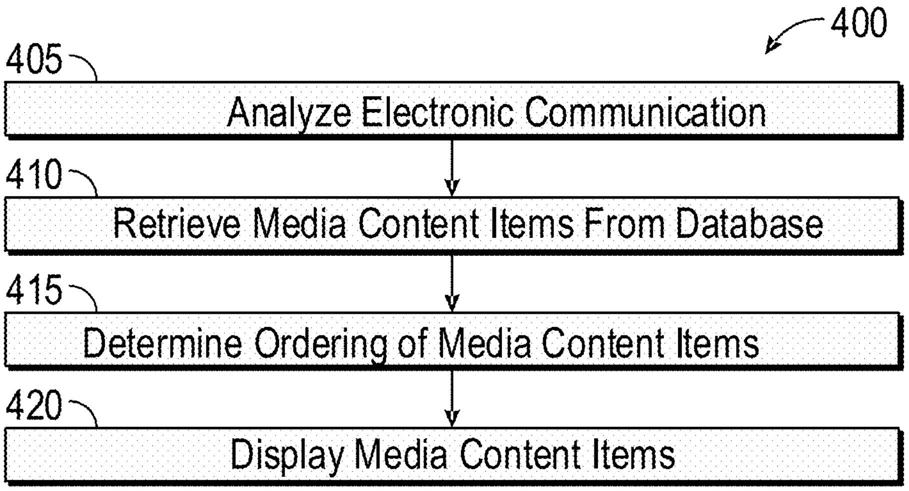
FIG. 4 is an exemplary flow diagrams of a process according to various aspects of the disclosure.

FIG. 4 depicts an exemplary process according to various aspects of the present disclosure. In this example, method 400 includes analyzing one or more electronic communications (405) exchanged by a plurality of computing devices over the Internet to identify the users of the respective computing devices, retrieving a plurality of media content items containing avatars of the users (410), determining an ordering of the media content items (415), and causing the media content items to display (420) on one or more computing devices. The steps of method 400 may be performed in whole or in part, may be performed in conjunction with some or all of the steps in other methods, and may be performed by any number of different systems, such as the systems described in FIGS. 1 and 7.

Figure 5A:
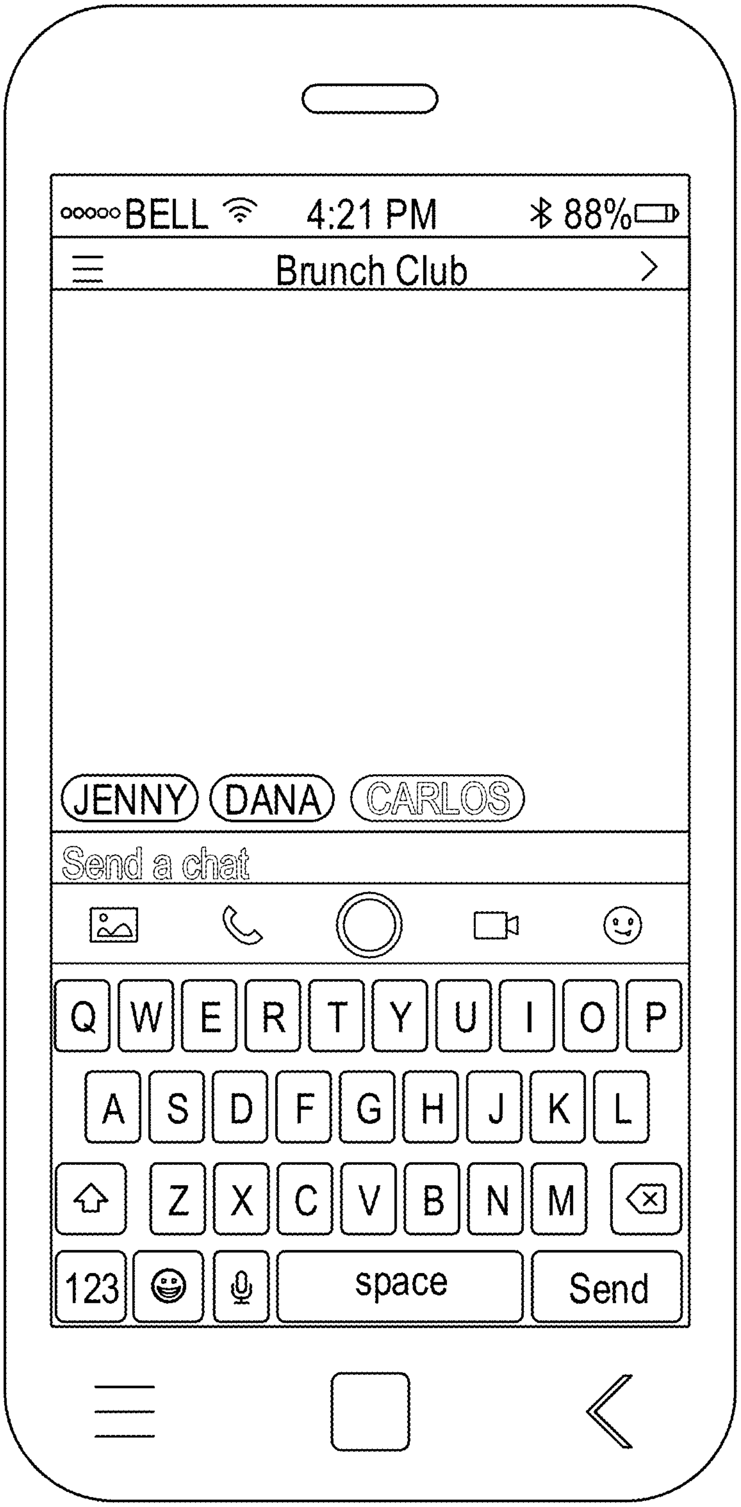
FIGS. 5A-5G are screenshots illustrating aspects of the steps of the method described in FIG. 4.
Figure 5B:
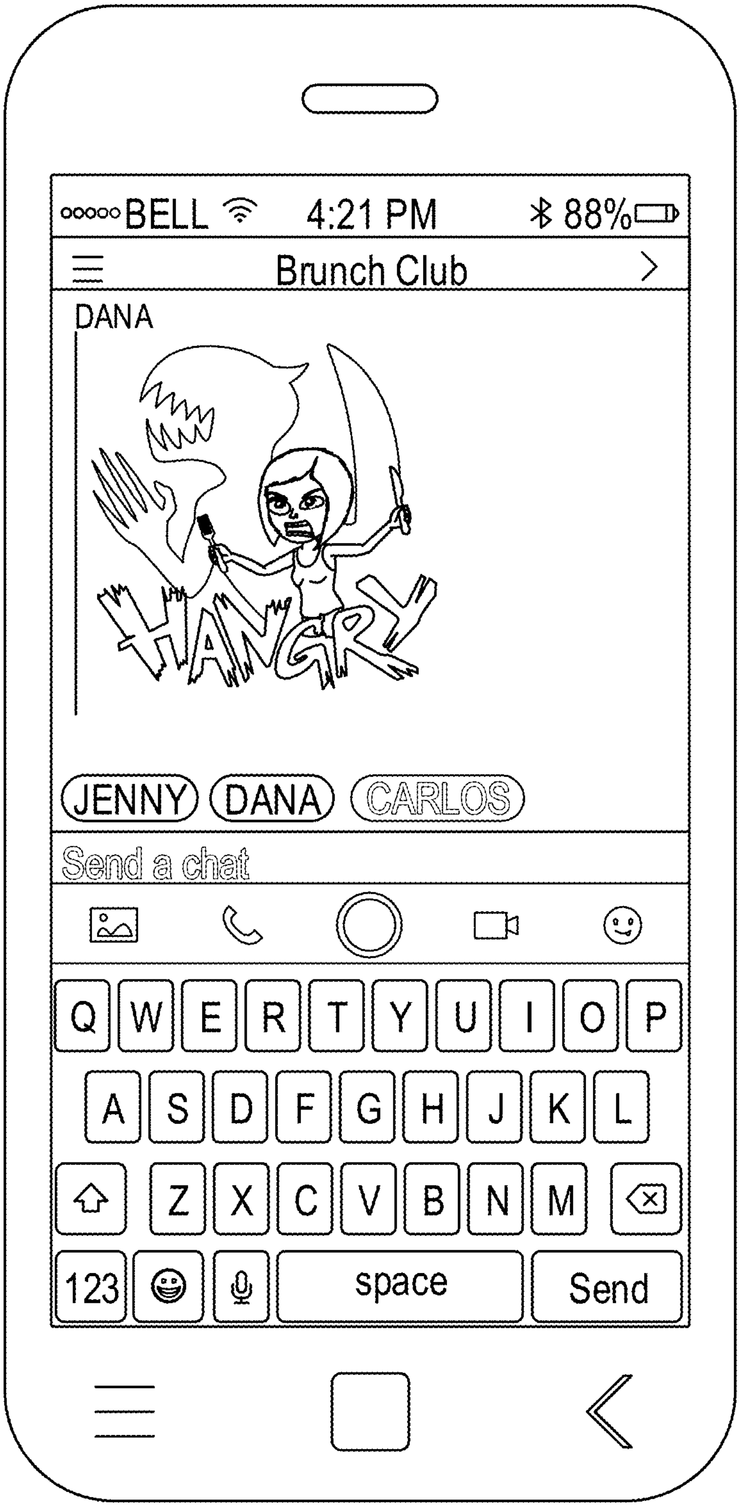

Embodiments of the present disclosure may analyze any number of electronic communications (such as emails, text messages, chat messages, and the like) between any number of computing devices and users. In the example depicted in FIG. 5A, a user (Jason) enters a chat called "Brunch Club" with three other users (Jenny, Dana, and Carlos). FIGS. 5A-5G show screenshots from the perspective of Jason's mobile device. FIG. 5B depicts a message sent from Dana to Jason's computing device (and also to the computing devices of Jenny and Carlos) which depicts Dana's avatar. The chat environment in FIGS. 5A-5G may be implemented by any desired combination of systems and devices, such as by messaging server system 108 in FIG. 1.

The system analyzes (410) one or more electronic communications exchanged between two or more computing devices to identify the users associated with the communication. For example, the system may analyze a text message transmitted from a computing device of a first user to a computing device of a second user to identify the sender (the first user) and the recipient (the second user) of the communication. Similarly, the system may analyze text messages and emails sent to multiple recipients to identify the sender and recipients. In the Example depicted in FIGS. 5A-5G, the system may analyze chat messages sent from a user (e.g., Dana in FIG. 5B) to the rest of the group (e.g., Jason, Jenny, and Carlos). Accordingly, the system may analyze any number of electronic communications associated with any number of different computing devices to identify the respective users associated with each respective computing device.

The system may analyze meta data associated with one or more communications to, such as the size of the communication, the date/time it was sent, one or more languages used in the communication, identifiers for the sender or recipient(s), information regarding the computing devices (e.g. the mobile devices of the sender or recipient or a messaging server) involved in transmitting or receiving the communication, and other information. In the case of identification information, any such identifier may be used, such as the user's full name or a username associated with the user. The user identifier may also be an identifier associated with the user's computing device, such as a Unique Device Identifier (UDID) or Identifier for Advertising (IDFA). The communication data may also include text, images, video, and other content within a communication. In addition to analyzing electronic communications to identify users, the system may also use the analysis of the communications to retrieve (410) media content items, determine their ordering (415), or both.

The system may request authorization from a user to analyze communication data associated with the user's communications. The authorization request may be presented to the user via the user's computing device and may allow the user to select the types of communication data the system may analyze as well as allowing the user to entirely disable the system from analyzing the user's communication data altogether. In cases where the user grants the system access to analyze the user's communication data, the system can analyze the communication data to automatically identify users associated with the communication.

The system can generate characteristics for avatars that represent the different users and use such avatar characteristics to generate images and other media content items containing the avatars of the users. As used herein, an "avatar" of a user is any visual representation of user. The avatar of a user may be based on images of the user. Alternatively or additionally, the user may select and customize characteristics of the user's avatar via the user's computing device. Such characteristics may include, for example, the user's bodily features (e.g., muscular, thin, etc.), facial features, clothing and accessories, text displayed in conjunction with the avatar, and images displayed in conjunction with the avatar.

Embodiments of the present disclosure may generate media content items containing any number of avatars, and store such media content items for later retrieval (410) in a database. For example, an image containing a single avatar may be generated in some cases, while an image containing multiple user avatars may be generated in other cases.

Figure 5C:
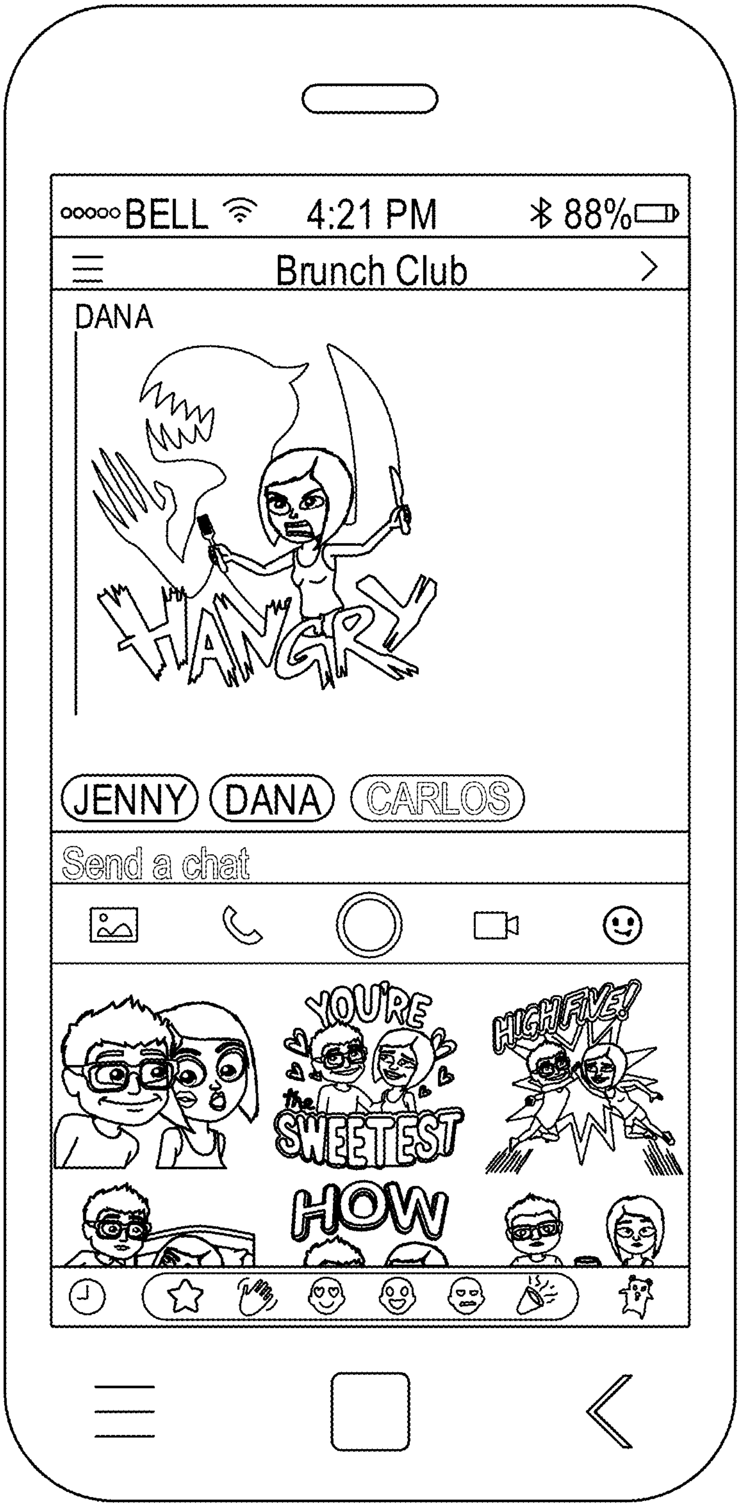

The system may retrieve (410) media content items, order media content items (415), or both, based on a variety of different criteria. For example, the system may identify a group of users with whom a first user is communicating with, and select media content items that contain the avatar of the first user as well as the avatars of the other users communicating with the first user. Referring now to FIG. 5C, for example, Jason sees Dana's message (at the top of the screen) and selects an icon at the bottom of his screen to bring up a gallery of media content items. In this example, the system retrieves (410) images containing both Jason's avatar and Dana's avatar based on the computing device upon which the images are displayed being operated by Jason, and orders (415) the images containing Dana based on Dana being the most recent user to transmit an electronic communication, thus displaying the images featuring Dana's avatar ahead of images that do not feature Dana's avatar.

On Jenny's computing device, by contrast, the system may display images with Jenny and Dana's avatars. In this manner, the system may retrieve a first plurality of media content items and display them on a first computing device, and retrieve a second plurality of media content items on a second computing device, thus customizing the groups of media content items displayed to different users. In some cases, the system may display the same media content items to different devices. For example, Dana's computing device may display some or all of the same images shown on Jason's device in FIG. 5C.

The system may further retrieve (410) or order (415) media content items based on other data received from the computing devices of users communicating with each other or from other systems and devices. Such information may include, for example, geolocation information, date and time information, motion information (and combinations thereof) from one or more computing devices. In one specific example, in a case where a first user and second user are engaged in a conversation involving electronic communications, geolocation information from a first user's device may be cross-referenced with geolocation information from a second user's device to determine the first user and second user are both at the same sporting event and to generate or retrieve media content items depicting the first user and the second user wearing the jerseys of their local team playing at the sporting event. The system may further determine it is night time where the first and second users are located, and generate a night sky in the background. In another example, the system may utilize motion information from a user's computing device to determine the user is 40,000 feet in the air and travelling at 400 mph, and is thus likely on an airplane. The system may then generate/retrieve media content related to flight or travel.

The system may retrieve (410) or order (415) media content items based on various events, as well as actions taken by the users engaged in a conversation involving the exchange of electronic communications. For example the system may determine a current mood of one or more users engaged in a conversation involving the exchange of electronic communications. In some embodiments, the user may explicitly indicate the user's mood (e.g., happy, sad, tired, etc.). Additionally or alternatively, the system may analyze the content of one or more electronic communications to determine the mood of individual users involved in the communication, as well as an overall tone of the conversation or communication (e.g., upbeat, sad, serious, playful, enthusiastic). In some embodiments, the system performs a text analysis to look for keywords associated with emotions and mood from the different users in a conversation. In other embodiments, the system may analyze an image (or metadata associated therewith) to determine a user's mood. In FIG. 5A, for example, the system may analyze the image posted by Dana (or review a "mood" tag in its metadata) to determine Dana is currently both hungry and grumpy.

The moods of individual users may be different from each other, and the mood of a user may affect the tone of a conversation or it may be independent thereof. For example, a first user (e.g., Dana) might post the image in FIG. 5A (indicating she is hungry/grumpy) but proceed to discuss a work-related matter with the group (e.g., a neutral tone) or a pleasant event she just experienced (e.g., a positive or happy tone). In such a case, Dana's mood has little impact on the bulk of the discussion beyond her initial post. By contrast, if other users post similarly negative content in the discussion (e.g., Jason is tired, Carlos is upset, Jenny is feeling overworked), the system may determine that the overall tone of the series of electronic communications in the conversation is negative and display (420) media content items for inclusion in the conversation that are similarly negative. Alternatively, particularly where the tone of a conversation or mood of a user is determined to be negative, the system may display (420) media content that is contrary to the negative tone/mood to help users have a more positive tone in their conversation or lighten the mood of a user feeling negatively.

The level of similarity between a determined mood of a user or tone of a conversation and the mood or tone associated with a media content item may be expressed using any desired scale. For example, each media content item may contain metadata identifying a mood or tone associated with the media content item (e.g., happy, sad, tired, etc.) and ranking (e.g., on a 1-10 scale) of the degree of the mood or tone. Similarly, the system may identify a mood of a user or tone of a conversation and assign a 1-10 ranking to the mood or tone in order to compare it to the meta data for the media content items. There may be multiple moods/tones associated with each media content item.

Using the example in FIG. 5A, Dana's "hangry" image may contain metadata associating the image with "hungry" and "angry" and rank each with a 6 on the 1-10 scale. The system may then retrieve (410) media content items having at least a 6 in either the "hungry" or "angry" categories and order (415) such media content ahead of other content items when displayed (420) to the user in the user's gallery.

Figure 5D:
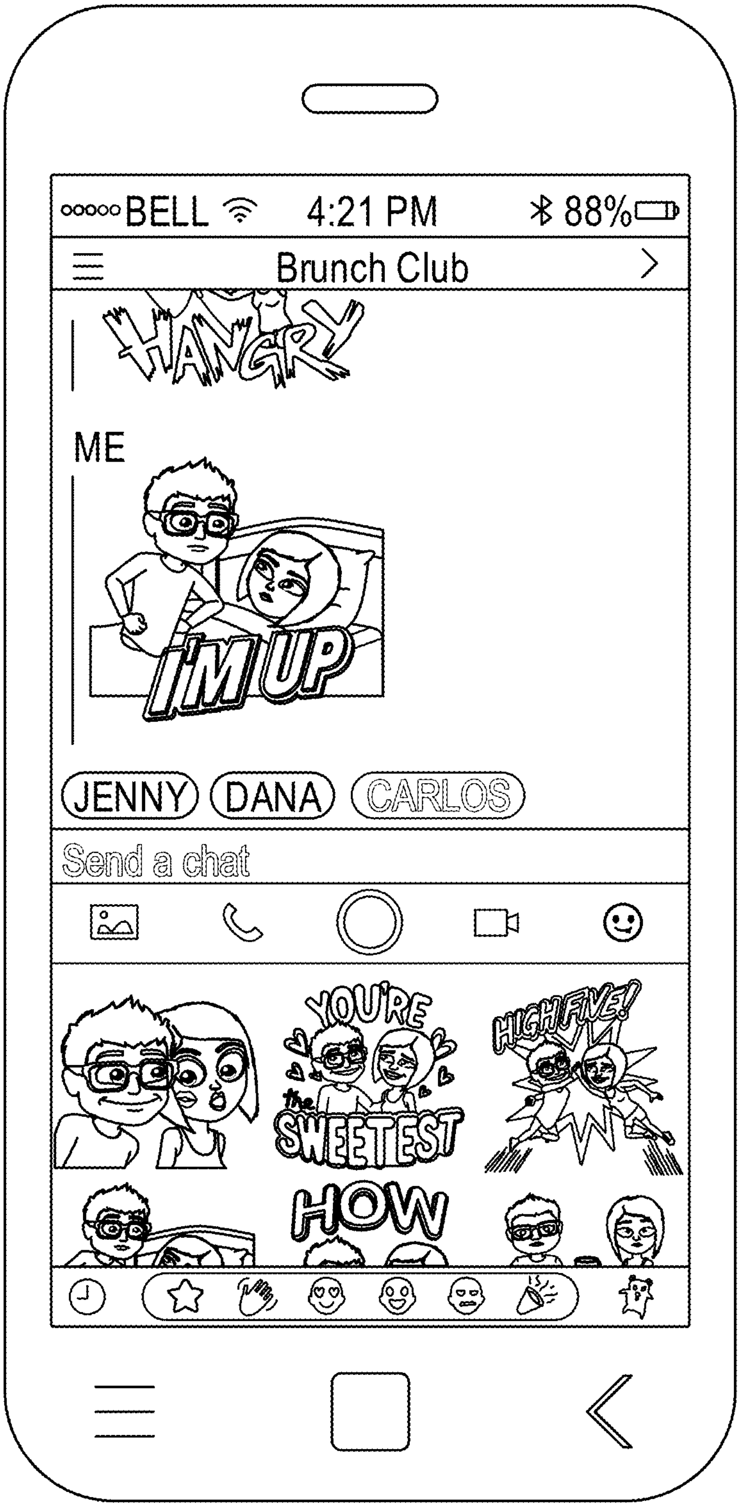

The system may display media content items (420) on the display screen of one or more computing devices, such as in a menu of image options to include within an electronic communication to another user, or within electronic communication itself. Media content items generated by embodiments of the present disclosure may include any number of user avatars in a variety of forms. In some embodiments, the system may retrieve (410) media content items or order such content (415) for display (420) based on the mood of one or more users, the tone of one or more communications, or both. For example, the system may determine the tone associated with an electronic communication and select from the database at least a portion of the media content items retrieved (410) based on a level of similarity (or dissimilarity) of the tone of the media content items and the tone associated with the communication(s). In a specific example, referring again to FIG. 5C, the retrieves media content items providing a sympathetic/positive response to Dana's "Hangry" post and orders the two most sympathetic images (the kiss on the cheek image and the "You're the Sweetest" image) ahead of the remaining images in the gallery. In other cases, the system could display images that are similarly negative like Dana's image ahead of other images in the gallery. In FIG. 5D, Jason has selected the "I'm Up" image from the gallery at the bottom of the screen and sends this image in the chat window.

Figure 5E:
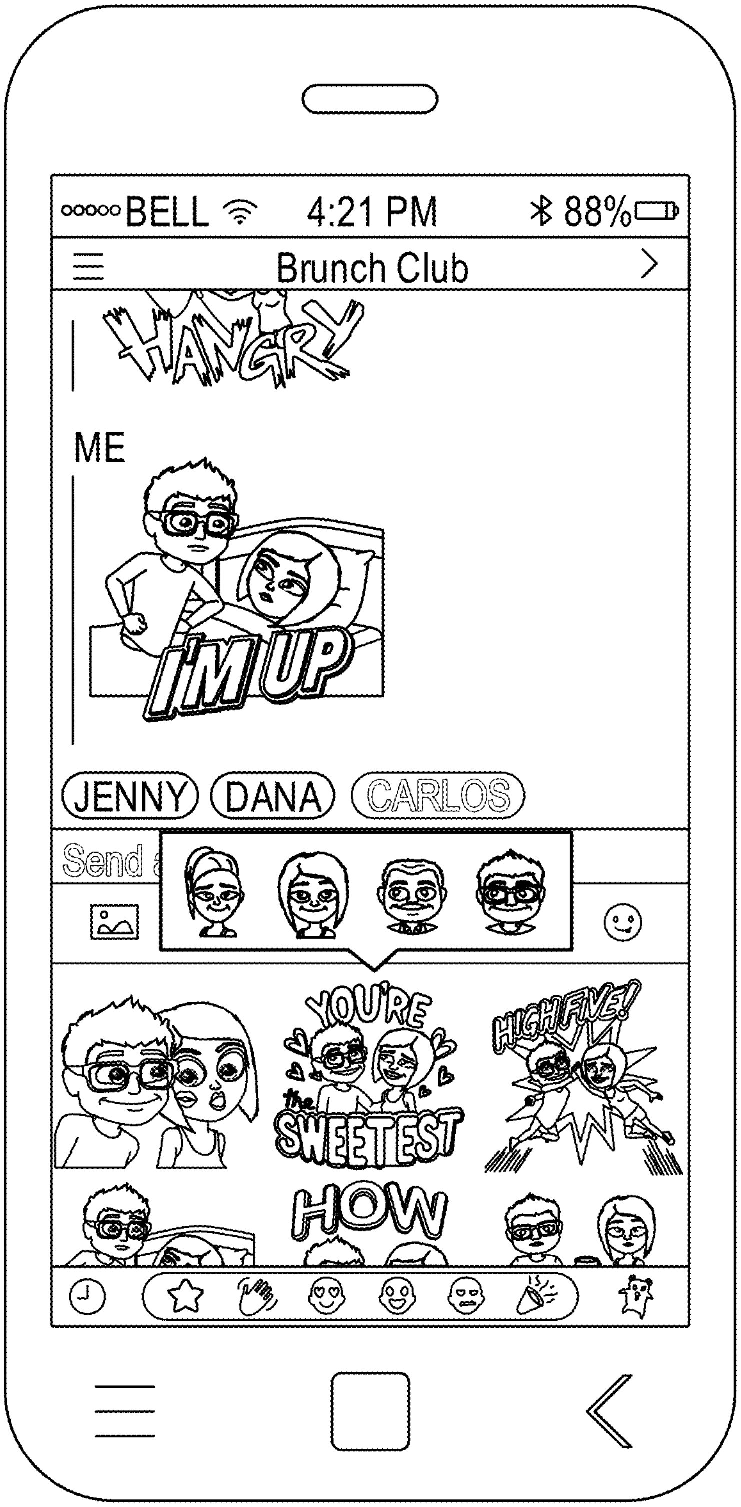

The system may allow users to select the avatars they wish to view in the media content items available to them in their gallery. In FIG. 5E, for example, Jason selects (with a long-press on the touchscreen of his computing device in this example) on the "you're the sweetest" image containing Jason's avatar and Dana's avatar. The system displays a menu showing avatars of the four users in the chat conversation (from left to right: Jenny, Dana, Carlos, and Jason). In this example, the avatar menu is ordered to match the "Group Presence Bar" at the bottom of the chat window that shows showing the other users who are currently viewing the chat first (Jenny and Dana) with those who are not (Carlos) second.

Figure 5F:
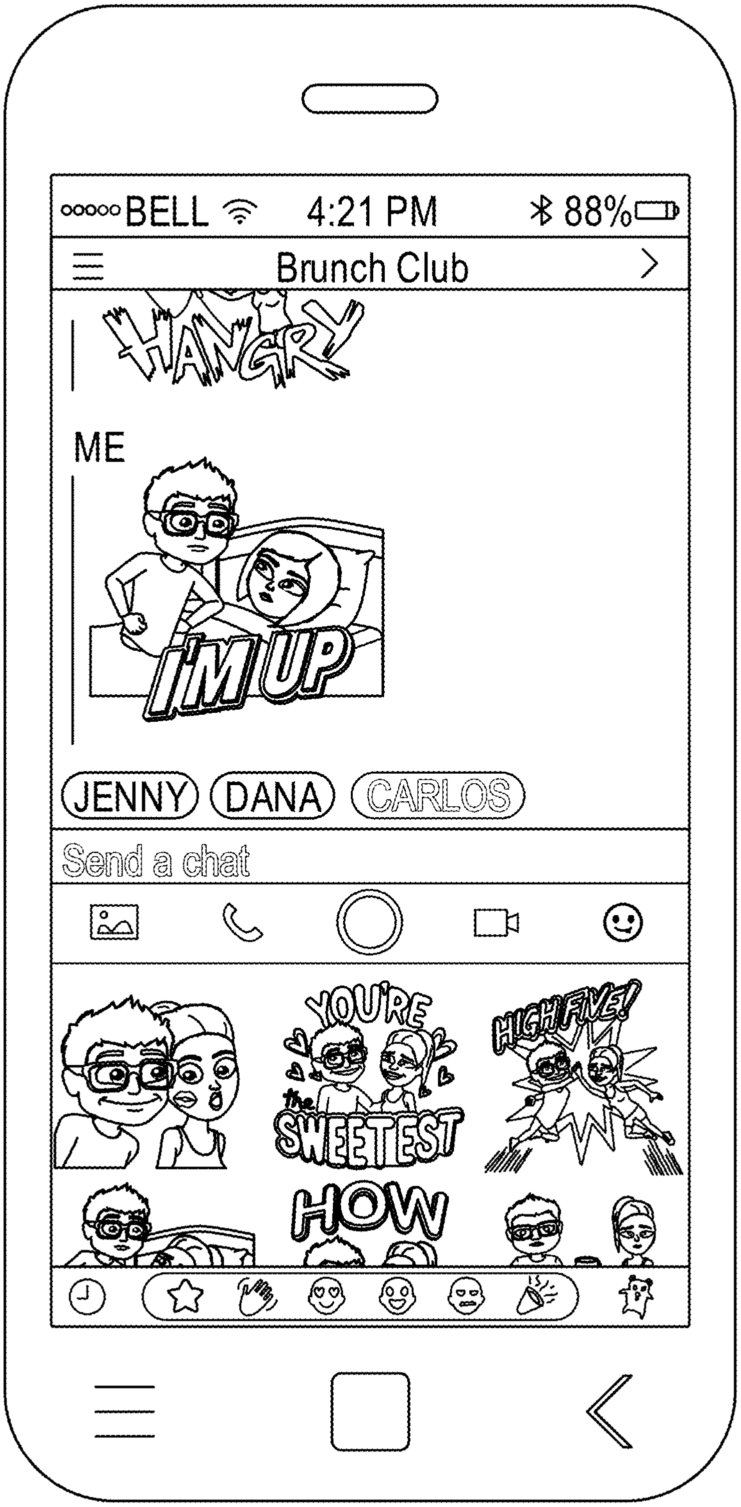
Figure 5G:
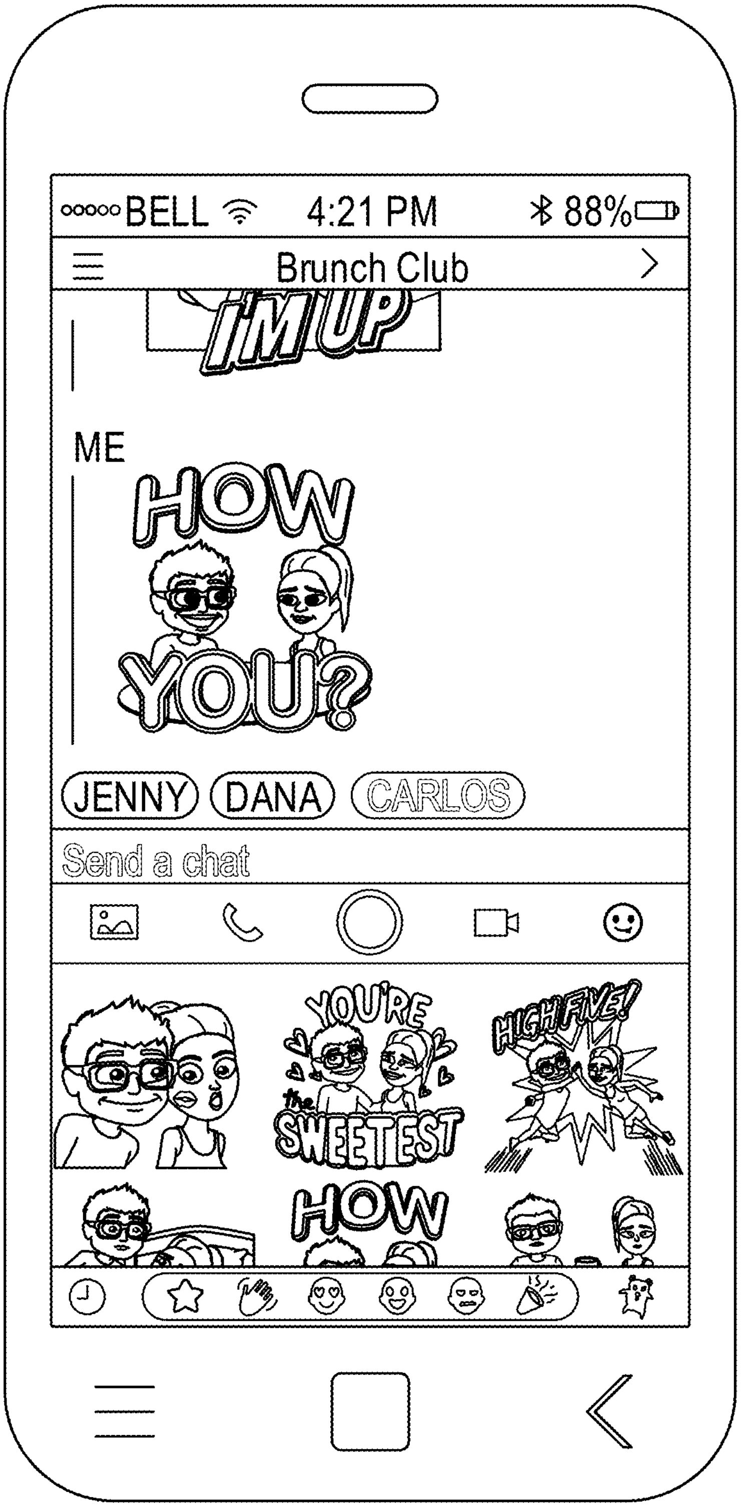

In FIG. 5F, Jason has selected Jenny's avatar from the avatar menu in FIG. 5E, and the system loads Jason's gallery of media content items with images featuring Jason's avatar with Jenny's avatar instead of Dana's avatar. In FIG. 5G, Jason selects the "How You" image to send it in the chat.

Embodiments of the disclosure may generate an event story or event gallery based on a collection or series of electronic communications between users and provide temporary access to the event story or gallery. Any collection of such communications may be selected based on any criteria, and one or more users may be granted access to an event story or gallery for any desired predetermined period of time. Likewise, the system may grant access to media content items for a predetermined period of time. Media content items generated or retrieved by the system may also be presented in conjunction with a media overlay (e.g., a SNAPCHAT filter).

Software Architecture

Figure 6:
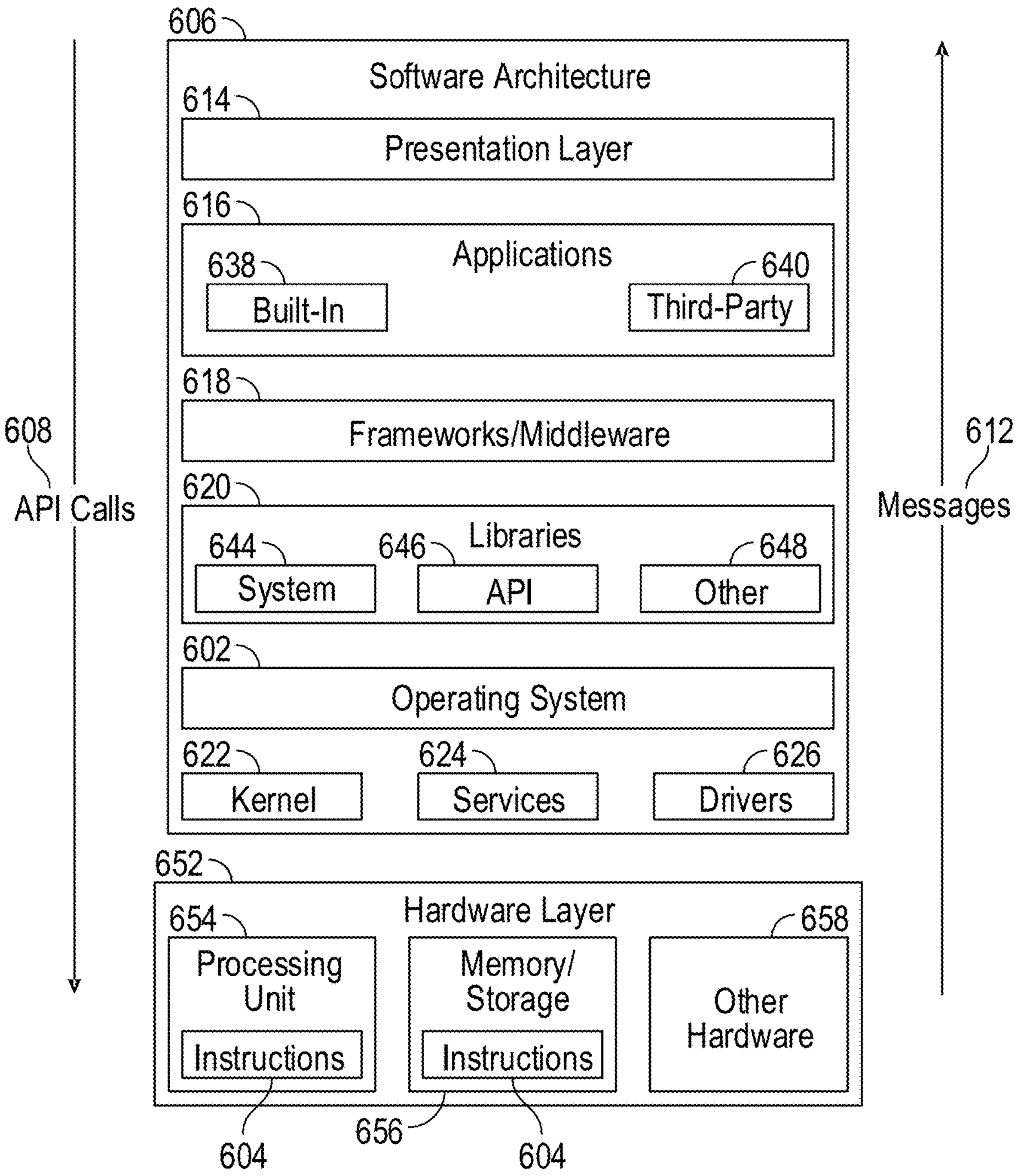
FIG. 6 is a block diagram illustrating a representative software architecture, which may be used in conjunction with various hardware architectures herein described.

FIG. 6 is a block diagram illustrating an exemplary software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory or storage modules memory/storage 656, which also have executable instructions 604. The hardware layer 652 may also comprise other hardware 658.

As used herein, the term "component" may refer to a device, physical entity or logic having boundaries defined by function or subroutine calls, branch points, application program interfaces (APIs), as well as other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 or other components within the layers may invoke application programming interface (API) API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616, other components, layers, or combinations thereof. The libraries 620 provide functionality that allows other software components to perform tasks in an easier fashion than to interface directly with the underlying operating system 602 functionality (e.g., kernel 622, services 624 or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 or other software components/modules, some of which may be specific to a particular operating system 602 or platform.

The applications 616 include built-in applications 638 or third-party applications 640. Examples of representative built-in applications 638 may include, but are not limited to, a contacts application, a browser application, a book reader application, a location application, a media application, a messaging application, or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

Figure 7:
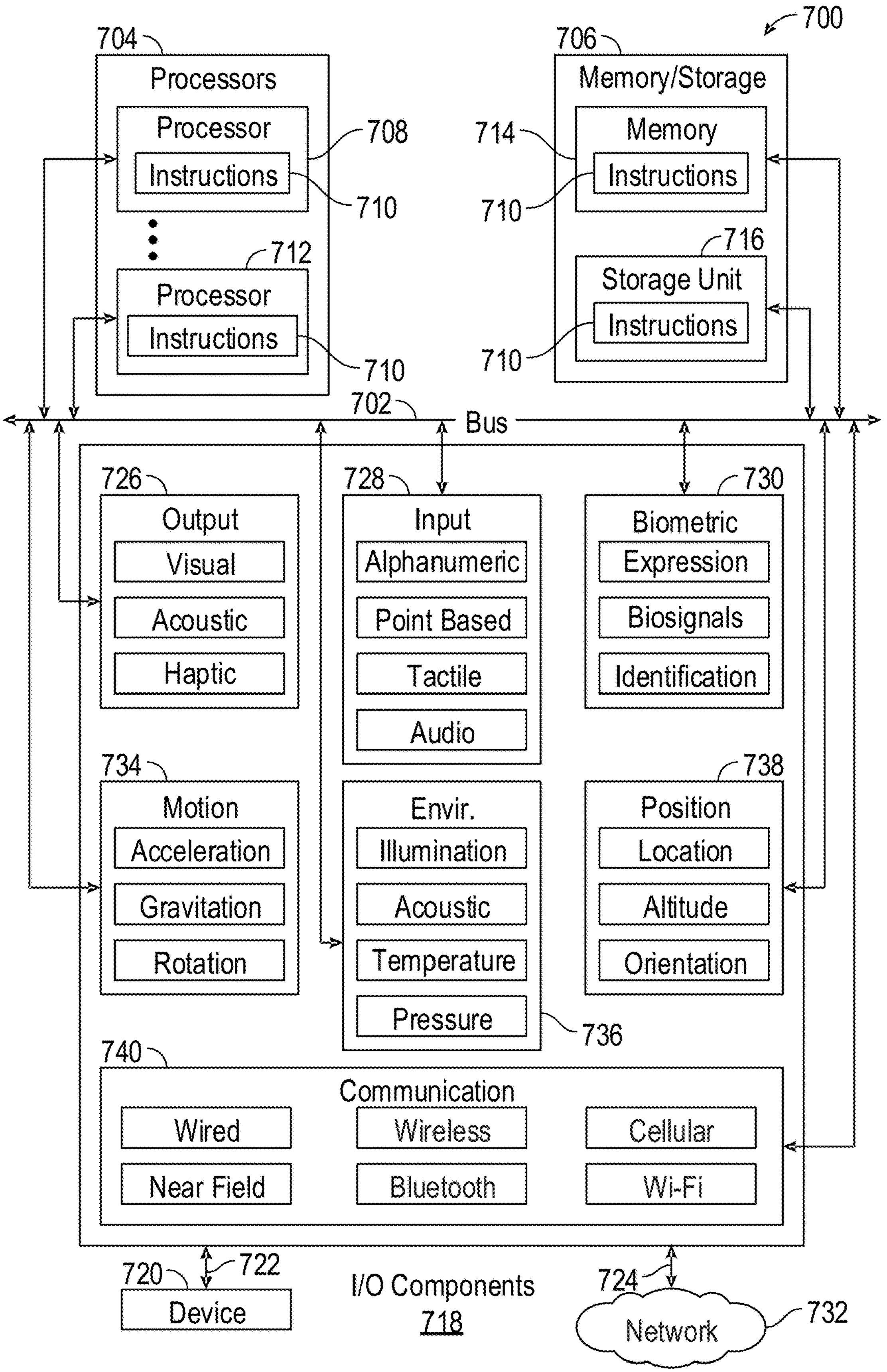
FIG. 7 is a block diagram illustrating components of a machine, according to some exemplary embodiments, able to read instructions from a machine-readable medium (e.g., a machine-readable storage medium) and perform any one or more of the methodologies discussed herein.

FIG. 7 is a block diagram illustrating components (also referred to herein as "modules") of a machine 700, according to some exemplary embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per sc.

The I/O components 718 may include a wide variety of components to provide a user interface for receiving input, providing output, producing output, transmitting information, exchanging information, capturing measurements, and so on. The specific I/O components 718 that are included in the user interface of a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various exemplary embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like. The input components 728 may also include one or more image-capturing devices, such as a digital camera for generating digital images or video.

In further exemplary embodiments, the I/O components 718 may include biometric components 730, motion components 734, environmental environment components 736, or position components 738, as well as a wide array of other components. One or more of such components (or portions thereof) may collectively be referred to herein as a "sensor component" or "sensor" for collecting various data related to the machine 700, the environment of the machine 700, a user of the machine 700, or a combinations thereof.

For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like. For example, the location sensor component may provide location information associated with the system 700, such as the system's 700 GPS coordinates or information regarding a location the system 700 is at currently (e.g., the name of a restaurant or other business).

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016, SNAP, INC. 2016, All Rights Reserved.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:

in an automated procedure using one or more computer processor devices configured therefore, performing analysis of a conversation comprising a series of messages communicated via an online messaging platform between a set of participants that includes a target user;

based on the analysis, generating one or more custom media content items for inclusion in a further message from the target user in furtherance of the conversation, each custom media content item including a target avatar associated with the target user, and each custom media content item being customized in appearance based on the analysis of the conversation;

causing display, on a client device associated with the target user, of the one or more custom media content items as a user-selectable candidate media content items for inclusion in the further message by the target user; and responsive to user-selection of the custom media content item, including the selected media content item in the further message from the target user.

2. The method of claim 1, further comprising:

selecting a set of candidate media content items that includes the one or more custom media content items generated based on analysis of the conversation; and causing display on the client device a gallery presenting the set of candidate media content items as user-selectable options for inclusion in the further message in a current message drafted by the target user, the gallery displaying a plurality of items from the set of media content items generated based on the analysis.

3. The method of claim 2, wherein generating at least one of the one or more custom media content items comprises modifying an appearance of the target avatar based at least in part on the analysis.

4. The method of claim 3, wherein customizing appearance of the target avatar is based at least in part on a current location of the target user.

5. The method of claim 4, wherein said at least one custom media content item includes a plurality of avatars representing a corresponding plurality of participants to the conversation, the generating of said custom media content items comprising customizing the appearances of each of the plurality of avatars based at least in part on the analysis of the conversation.

6. The method of claim 5, further comprising similarly customizing the appearances of each of the plurality of avatars based on identification via respective client device location data that the plurality of participants share a current location in common.

7. The method of claim 6, wherein the customizing of the plurality of avatars is based at least in part on event information of an event referenced in the conversation and occurring at the common location.

8. The method of claim 7, wherein customizing the appearances of the plurality of avatars comprises depicting the avatars as clothed specifically for the event.

9. The method of claim 4, wherein the generating of the one or more custom media content items comprises depicting the target avatar set against a custom backdrop for the target avatar based on the current location of the target user.

10. The method of claim 3, wherein modifying the appearance of the target avatar is based at least in part on a traveling speed of the target user indicated by location data sourced from the associated client device, the modifying comprising depicting the target avatar in a particular type of vehicle selected based on the traveling speed.

11. The method of claim 1, wherein the analysis of the conversation includes identifying a tone associated with at least a portion of the conversation.

12. The method of claim 11, wherein selecting the set of candidate media content items, includes selecting at least part of the set based on a level of similarity between the tone of each of the selected media content items and the identified tone of said portion of the conversation.

13. A system comprising:

a processor; and memory coupled to the processor and storing instructions that, when executed by the processor, cause the system to perform operations comprising:

performing analysis of a conversation comprising a series of messages communicated via an online messaging platform between a set of participants that includes a target user;

based on the analysis, generating one or more custom media content items for inclusion in a further message from the target user in furtherance of the conversation, each custom media content item including a target avatar associated with the target user, and each custom media content item being customized in appearance based on the analysis of the conversation;

causing display, on a client device associated with the target user, of the one or more custom media content items as user-selectable candidate media content items for inclusion in the further message by the target user; and responsive to user-selection of the custom media content item, including the selected media content item in the further message from the target user.

14. The system of claim 13, wherein the operations further comprise:

selecting a set of candidate media content items that includes the one or more custom media content items generated based on analysis of the conversation; and causing display on the client device a gallery presenting the set of candidate media content items as user-selectable options for inclusion in the further message in a current message drafted by the target user, the gallery displaying a plurality of items from the set of media content items generated based on the analysis.

15. The system of claim 14, wherein generating at least one of the one or more custom media content items comprises modifying an appearance of the target avatar based at least in part on the analysis.

16. The system of claim 15, wherein customizing appearance of the target avatar is based at least in part on a current location of the target user.

17. The system of claim 16, wherein said at least one custom media content item includes a plurality of avatars representing a corresponding plurality of participants to the conversation, the generating of said custom media content items comprising customizing the appearances of each of the plurality of avatars based at least in part on the analysis of the conversation.

18. The system of claim 17, wherein the operations further comprise similarly customizing the appearances of each of the plurality of avatars based on identification via respective client device location data that the plurality of participants share a current location in common.

19. The system of claim 13, wherein the analysis of the conversation includes identifying a tone associated with at least a portion of the conversation.

20. A non-transitory computer-readable medium storing instructions that, when executed by a computer system, cause the computer system to perform operations comprising:

Performing analysis of a conversation comprising a series of messages communicated via an online messaging platform between a set of participants that includes a target user;

based on the analysis, generating one or more custom media content items for inclusion in a further message from the target user in furtherance of the conversation, each custom media content item including a target avatar associated with the target user, and each custom media content item being customized in appearance based on the analysis of the conversation;

causing display, on a client device associated with the target user, of the one or more custom media content items as user-selectable candidate media content items for inclusion in the further message by the target user; and responsive to user-selection of the custom media content item, including the selected media content item in the further message from the target user.

* * * * *